(12) United States Patent
Zhang et al.

(10) Patent No.: US 11,234,230 B2
(45) Date of Patent: Jan. 25, 2022

(54) SIGNAL TRANSMISSION METHOD AND SYSTEM, AND CONTROL INFORMATION TRANSMISSION METHOD AND DEVICE

(71) Applicant: XI'AN ZHONGXING NEW SOFTWARE CO., LTD., Shaanxi (CN)

(72) Inventors: Shujuan Zhang, Shenzhen (CN); Zhaohua Lu, Shenzhen (CN); Yu Ngok Li, Shenzhen (CN); Bo Gao, Shenzhen (CN); Yijian Chen, Shenzhen (CN); Nan Zhang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 64 days.

(21) Appl. No.: 16/611,048

(22) PCT Filed: Jun. 11, 2018

(86) PCT No.: PCT/CN2018/090617
§ 371 (c)(1),
(2) Date: Nov. 5, 2019

(87) PCT Pub. No.: WO2018/202213
PCT Pub. Date: Nov. 8, 2018

(65) Prior Publication Data
US 2020/0163059 A1    May 21, 2020

(30) Foreign Application Priority Data

May 5, 2017 (CN) .................. 201710313919.X

(51) Int. Cl.
*H04W 72/04* (2009.01)
*H04B 7/0408* (2017.01)
(Continued)

(52) U.S. Cl.
CPC ........ *H04W 72/042* (2013.01); *H04B 7/0408* (2013.01); *H04L 5/0051* (2013.01);
(Continued)

(58) Field of Classification Search
CPC .. H04W 72/042; H04W 24/10; H04B 7/0408; H04B 7/0617; H04L 5/0051; H04L 5/10;
(Continued)

(56) References Cited

U.S. PATENT DOCUMENTS

2012/0140660 A1   6/2012 Kang
2013/0201938 A1   8/2013 Seol
(Continued)

FOREIGN PATENT DOCUMENTS

CN   102098089 A   6/2011
CN   105490719 A   4/2016
(Continued)

OTHER PUBLICATIONS

Huawei et al., "UL Beam Management", 3GPP TGS RAN WG1 Meeting #88, R1-1704231, Apr. 7, 2017, pp. 1-7.
(Continued)

*Primary Examiner* — Jung H Park
(74) *Attorney, Agent, or Firm* — Cantor Colburn LLP

(57) ABSTRACT

Provided are a signal transmission method and system, and a control information transmission method and apparatus, the signal transmission method includes: a first communication node acquires M transmission mode sets; the first communication node determines N transmission mode sets for sending a first signal from the M transmission mode sets; and the first communication node sends the first signal to a second communication node by using the N transmission mode sets; where one transmission mode set includes at least one transmission mode, M is a natural number, and N is a natural number less than or equal to M.

18 Claims, 7 Drawing Sheets

(51) Int. Cl.
*H04L 5/00* (2006.01)
*H04L 5/10* (2006.01)
*H04L 25/02* (2006.01)
*H04W 24/10* (2009.01)

(52) U.S. Cl.
CPC ............ *H04L 5/10* (2013.01); *H04L 25/0226* (2013.01); *H04W 24/10* (2013.01)

(58) Field of Classification Search
CPC . H04L 25/0226; H04L 5/0023; H04L 5/0048; H04L 1/1607; H04L 5/0055
See application file for complete search history.

(56) References Cited

U.S. PATENT DOCUMENTS

| | | | |
|---|---|---|---|
| 2014/0119228 A1 | 5/2014 | Wang | |
| 2018/0279152 A1* | 9/2018 | Kim | H04W 72/046 |
| 2019/0173553 A1* | 6/2019 | Park | H04L 5/0048 |
| 2019/0200249 A1* | 6/2019 | Yoon | H04L 5/0023 |
| 2019/0207731 A1* | 7/2019 | Park | H04B 7/0628 |
| 2019/0356438 A1* | 11/2019 | Lee | H04B 7/0695 |
| 2021/0084640 A1* | 3/2021 | Kang | H04L 5/0048 |

FOREIGN PATENT DOCUMENTS

| | | |
|---|---|---|
| CN | 105790886 A | 7/2016 |
| CN | 108111267 A | 6/2018 |

OTHER PUBLICATIONS

International Search Report for corresponding applicatin PCT/CN2018/090617 filed Jun. 11, 2018; dated Aug. 21, 2018.
Zte et al., "UL Beam Management", 3GPP TGS RAN WG1 Meeting #88is, R1-1704399, Apr. 7, 2017, pp. 1-4.
Chinese Office Action for corresponding application 201710313919. X. Report dated Oct. 22, 2021.
Chinese Search Report for corresponding application 201710313919. X. Report dated Oct. 12, 2021.

* cited by examiner

SIGNAL TRANSMISSION METHOD AND SYSTEM, AND CONTROL INFORMATION TRANSMISSION METHOD AND DEVICE

CROSS-REFERENCES TO RELATED APPLICATIONS

This is a National Stage Application, filed under 35 U.S.C. 371, of International Patent Application No. PCT/CN2018/090617, filed on Jun. 11, 2018, which claims priority to a Chinese patent application No. 201710313919.X filed on May 5, 2017, disclosure of which is incorporated herein by reference in its entirety.

TECHNICAL FIELD

The present disclosure relates to, but is not limited to, communication technologies, and in particular relates to a signal transmission method and system and a control information sending method and apparatus.

BACKGROUND

High-frequency transmission, as one of core technologies in New Radio (NR), provides possibility for future large-capacity high-speed data transmission, but one core characteristic of high-frequency communication is large spatial fading, and the transmission distance is short. On the other hand, high-frequency wavelength is short, and large-capacity Multiple Input Multiple Output (MIMO) may be adopted, so that high-gain beams can be formed, and the transmission distance can be increased. However, since omnidirectional coverage by the beam cannot be achieved, and the NR has many different characteristics from Long Term Evolution (LTE), high-frequency communication based on beam transmission in the NR is a hot spot problem currently being studied.

A method for sending a high-frequency signal based on beam transmission in the NR technology is currently under study.

SUMMARY

Embodiments of the present disclosure provide a signal transmission method and system and a control information sending method and apparatus, so as to implement the sending of a high-frequency signal in the NR technology.

The embodiments of the present disclosure provide a signal transmission method. The method includes steps described below.

A first communication node acquires M transmission mode sets.

The first communication node determines N transmission mode sets for sending a first signal from the M transmission mode sets.

The first communication node sends the first signal to a second communication node by using the N transmission mode sets.

One transmission mode set includes at least one transmission mode, M is a natural number, and N is a natural number less than or equal to M.

The embodiments of the present disclosure further provide a control information sending method. The method includes steps described below.

A third communication node sends at least one piece of second-type control information to a first communication node so that the first communication node acquires M transmission mode sets and/or determines N transmission mode sets for sending a first signal from the M transmission mode sets.

One transmission mode set includes at least one transmission mode, M is a natural number, and N is a natural number less than or equal to M.

The embodiments of the present disclosure further provide a signal transmission method. The method includes steps described below.

A third communication node sends at least one piece of second-type control information to a first communication node.

The first communication node acquires, according to the at least one piece of second-type control information, M transmission mode sets and/or determines N transmission mode sets for sending a first signal from the M transmission mode sets.

The first communication node sends the first signal to a second communication node by using the N transmission mode sets.

The second communication node receives the first signal according to the N transmission mode sets.

One transmission mode set includes at least one transmission mode, M is a natural number, N is a natural number less than or equal to M, and the third communication node and the second communication node are a same communication node or different communication nodes.

The embodiments of the present disclosure further provide a signal transmission apparatus. The apparatus includes: an acquisition module, a first determination module and a first sending module.

The acquisition module is configured to acquire M transmission mode sets.

The first determination module is configured to determine N transmission mode sets for sending a first signal from the M transmission mode sets acquired by the acquisition module.

The first sending module is configured to send the first signal to a second communication node by using the N transmission mode sets determined by the first determination module.

One transmission mode set includes at least one transmission mode, M is a natural number, and N is a natural number less than or equal to M.

The embodiments of the present disclosure further provide a control information sending apparatus. The apparatus includes a second sending module.

The second sending module is configured to send at least one piece of second-type control information to a first communication node so that the first communication node acquires M transmission mode sets and/or determines N transmission mode sets for sending a first signal from the M transmission mode sets.

One transmission mode set includes at least one transmission mode, M is a natural number, and N is a natural number less than or equal to M.

The embodiments of the present disclosure further provide a signal transmission system. The system includes: a first communication node, a second communication node and a third communication node, where the third communication node and the second communication node are a same communication node or different communication nodes.

The third communication node is configured to send at least one piece of second-type control information to the first communication node.

The first communication node is configured to acquire, according to the at least one piece of second-type control information, M transmission mode sets and/or determine N transmission mode sets for sending a first signal from the M transmission mode sets.

The first communication node is configured to send the first signal to the second communication node by using the N transmission mode sets.

The second communication node is configured to receive the first signal according to the N transmission mode sets.

One transmission mode set includes at least one transmission mode, M is a natural number, and N is a natural number less than or equal to M.

The embodiments of the present disclosure further provide a computer-readable storage medium, which is configured to store computer programs, where when the computer programs are executed by a processor, the steps in the signal transmission method described in the embodiments of the present disclosure are implemented; or when the computer programs are executed by the processor, the steps in the control information sending method described in the embodiments of the present disclosure are implemented.

The embodiments of the present disclosure further provide a signal transmission apparatus. The apparatus includes: a processor and a memory configured to store computer programs capable of being run on the processor.

The processor is configured to execute the steps in the signal transmission method described in the embodiments of the present disclosure when the computer programs are run.

The embodiments of the present disclosure further provide a control information sending apparatus. The apparatus includes: a processor and a memory configured to store computer programs capable of being run on the processor.

The processor is configured to execute the steps in the control information sending method described in the embodiments of the present disclosure when the computer programs are run.

The embodiments of the present disclosure include steps as follows: a first communication node acquires M transmission mode sets; the first communication node determines N transmission mode sets for sending a first signal from the M transmission mode sets; and the first communication node sends the first signal to a second communication node by using the N transmission mode sets; where one transmission mode set includes at least one transmission mode, M is a natural number, and N is a natural number less than or equal to M. In the embodiments of the present disclosure, sending of a high-frequency signal based on beam transmission in the NR technology is implemented. Further, how to select a transmission mode set from a plurality of transmission mode sets for sending the first signal and how to determine a candidate transmission mode set corresponding to a signal are researched for a downlink reference signal, so that the transmission mode of the first signal is acquired according to a transmission mode of a second signal. The first signal may be an uplink signal and the second signal may be a downlink signal.

According to the embodiments of the present disclosure, different transmission modes are configured for different signal types, or different acquisition modes of transmission modes are configured for different types of signals, or different types of signals share a transmission mode resource pool firstly and then information about transmission modes of different signal types are respectively notified through control information. The problem that different signal types require different transmission modes is solved, and the signaling overhead can also be further controlled through the method of sharing the transmission mode resource pool.

Other features and advantages of the embodiments of the present disclosure will be elaborated hereinafter in the description and, moreover, partially become apparent from the description, or will be understood through implementation of the present disclosure. The object and other advantages of the present disclosure may be implemented and obtained through structures set forth in the description, claims and drawings.

BRIEF DESCRIPTION OF DRAWINGS

The drawings are used to provide a further understanding of the technical solutions of the present disclosure, constitute a part of the description, explain the technical solutions of the present disclosure in conjunction with the embodiments of the present application, and do not limit the technical solutions of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

The steps shown in the flowcharts among the drawings may be executed by a computer system such as a group of computers capable of executing instructions. Although logical sequences are shown in the flowcharts, the shown or described steps may be executed in sequences different from those described herein in some cases.

Figure 1:
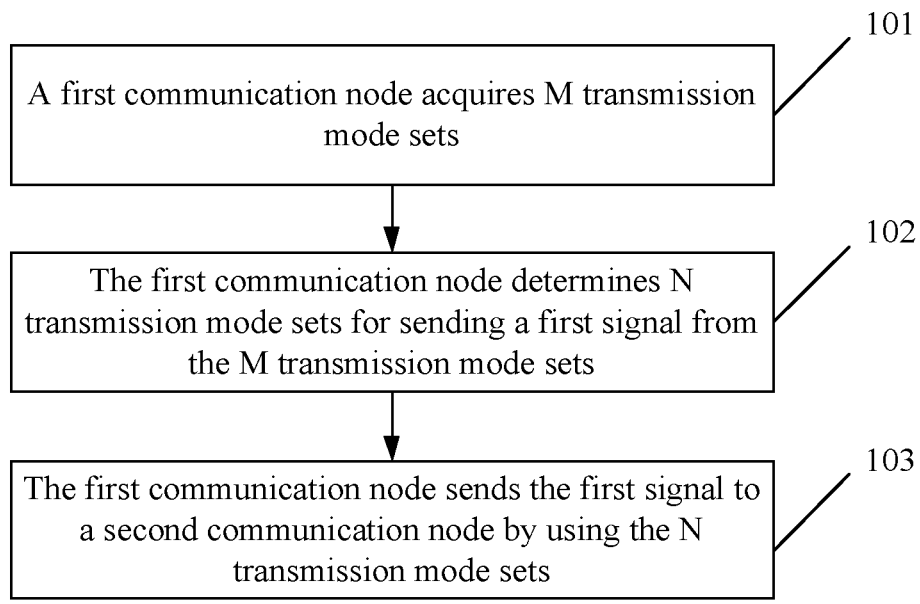
FIG. 1 is a flowchart of a signal transmission method according to an embodiment of the present disclosure.

As shown in FIG. 1, a signal transmission method in the embodiments of the present disclosure includes steps described below.

In step 101, a first communication node acquires M transmission mode sets.

In step 102, the first communication node determines N transmission mode sets for sending a first signal from the M transmission mode sets.

In step 103, the first communication node sends the first signal to a second communication node by using the N transmission mode sets.

One transmission mode set includes at least one transmission mode, M is a natural number, and N is a natural number less than or equal to M.

The first signal includes at least one of: a control channel signal, a data channel signal, a demodulation reference signal, or a measurement reference signal.

The different transmission modes may be distinguished through at least one of: sending beam information, reference signal resource information, reference signal resource set information, reference signal port information, reference signal port set information, information about a time domain resource where a reference signal is located, information about a frequency domain resource where a reference signal is located, precoding matrix information, sending beam index information, transmission diversity, repeated sending or a transmission mode. The transmission mode includes closed-loop transmission and open-loop transmission. Alternatively, the transmission mode may also be embodied by establishing a Quasi-Co-Location relationship (QCL) between reference signals, such as establishing a QCL relationship between a demodulation reference signal and an uplink reference signal of a Physical Uplink Control Channel (PUCCH), or establishing a QCL relationship between the demodulation reference signal and a downlink reference signal of the PUCCH. Two reference signals satisfy a QCL relationship, which refers to that a channel characteristic parameter of one reference signal may be derived from a channel characteristic parameter of the other reference signal. The channel characteristic parameter may include at least one of: delay spread, Doppler spread, Doppler shift, average delay, an average gain, an average vertical sending angle, an average horizontal sending angle, an average vertical angle of arrival, an average horizontal angle of arrival, a central vertical sending angle, a central horizontal sending angle, a central vertical angle of arrival, a central horizontal angle of arrival, a receiving beam set, or a sending beam set. The transmission mode may also be referred to as a sending mode. The transmission mode may also be embodied by establishing an association relationship between reference signals, for example, when reciprocity exists between the uplink and the downlink, a piece of downlink reference signal information is configured in the PUCCH configuration information, and the terminal (i.e., the first communication node) may obtain, based on the downlink reference signal information, the transmission mode information for sending the PUCCH, for example, by using a receiving beam or a receiving mode for receiving the downlink reference signal, and the sending beam or the transmission mode for sending the PUCCH is obtained according to reciprocity derivation.

In the embodiments of the present disclosure, the first communication node may be a terminal, the second communication node may be a base station, and the first signal may be an uplink signal.

In an embodiment, the first communication node acquires the M transmission mode sets in at least one of the following manners.

The M transmission mode sets are obtained by acquiring many transmission modes associated with first-type control information included in the first signal.

Second-type control information is received, and the M transmission mode sets are obtained according to the second-type control information.

The M transmission mode sets are obtained according to configuration information about a to-be-detected search space of a control channel in a time unit associated with the first signal.

The M transmission mode sets are obtained according to configuration information about a to-be-detected transmission mode of the control channel in the time unit associated with the first signal.

The M transmission mode sets are obtained according to configuration information about a to-be-detected receiving mode of the control channel in the time unit associated with the first signal.

The M transmission mode sets are obtained according to configuration information about a detected search space where the control channel is located in the time unit associated with the first signal.

The M transmission mode sets are obtained according to configuration information about a detected transmission mode of the control channel in the time unit associated with the first signal.

The M transmission mode sets are obtained according to configuration information about a detected receiving mode of the control channel in the time unit associated with the first signal.

The M transmission mode sets are obtained by acquiring a transmission mode of a second signal associated with the first signal.

The M transmission mode sets are obtained by acquiring a receiving mode of the second signal associated with the first signal.

Information about the M transmission mode sets is acquired in an implicit manner.

In an embodiment, the first communication node receives the second-type control information and obtains the M transmission mode sets according to the second-type control information in at least one of the following included manners.

The second-type control information includes information about a transmission mode set of a control channel signal sent by a third communication node, and the first communication node obtains the M transmission mode sets according to the transmission mode set of the control channel signal sent by the third communication node; where the third communication node and the second communication node are a same communication node or different communication nodes.

The second-type control information includes information about a receiving mode set of the control channel signal received by the first communication node, and the first communication node obtains the M transmission mode sets according to the information about the receiving mode set of the control channel signal received by the first communication node.

The second-type control information includes a plurality of pieces of control information, and the M transmission mode sets are obtained according to the plurality of pieces of control information.

The second-type control information includes first control information and second control information, where the first control information indicates information about a transmission mode resource pool shared by different signal types, the second control information indicates the information about the M transmission mode sets, and the M transmission mode sets belong to the transmission mode resource pool.

The second-type control information includes information about a first reference signal, and the first communication node acquires the information about the M transmission mode sets according to the first reference signal.

The second-type control information includes information about a second reference signal, and the first communication node acquires the information about the M transmission mode sets according to the second reference signal.

The second-type control information includes information about a synchronization signal, and the first communication node acquires the information about the M transmission mode sets according to the information about the synchronization signal.

The second-type control information is configured for triggering sending of information about the first signal and retransmission joint coding of the second signal associated with the first signal by using a multi-transmission mode set.

The second-type control information indicates information about a group of first reference signals or information about a group of second reference signals, and the first communication node acquires the M transmission mode sets according to the group of first reference signals or the group of second reference signals.

A transmission direction of the first reference signal is the same as a transmission direction of the first signal, and a transmission direction of the second reference signal is different from the transmission direction of the first signal.

In an embodiment, the first communication node determines the N transmission mode sets for sending the first signal from the M transmission mode sets by using at least one combination of the following manners.

Second-type control information is received, and the N transmission mode sets among the M transmission mode sets are determined according to an indication of the second-type control information.

The N transmission mode sets are determined according to time information corresponding to the M transmission mode sets.

The N transmission mode sets are determined according to a type of a second signal corresponding to the M transmission mode sets.

The N transmission mode sets are determined according to a type of first-type control information corresponding to the M transmission mode sets.

The N transmission mode sets are determined according to a priority order corresponding to the M transmission mode sets.

The N transmission mode sets are determined according to time domain density information corresponding to the M transmission mode sets.

The N transmission mode sets are determined according to receiving quality of the second signal corresponding to the M transmission mode sets.

The N transmission mode sets are determined according to whether a predetermined condition is satisfied.

The N transmission mode sets are determined according to information about a resource occupied by the first signal, where the information about the resource includes at least one of the following resources: a time domain resource, a frequency domain resource, a demodulation reference signal port resource or a sending antenna port resource.

In an embodiment, the step of determining the N transmission mode sets according to the time information corresponding to the M transmission mode sets includes: selecting N transmission mode sets corresponding to the latest time from the M transmission mode sets; where time corresponding to the one transmission mode set is time at which a second signal corresponding to the at least one transmission mode of the one transmission mode set is located, or the time corresponding to the one transmission mode set is time at which the first communication node acquires the at least one transmission mode of the one transmission mode set.

The step of determining the N transmission mode sets according to the type of the second signal corresponding to the M transmission mode sets includes: selecting transmission mode sets corresponding to a second signal having a high priority as the N transmission mode sets according to a priority of the type of the second signal, where the type of the second signal includes: a control channel signal, a data channel signal and a measurement reference signal, where the control channel signal, the data channel signal and the measurement reference signal are in descending order of priority.

The step of determining the N transmission mode sets according to the type of the first-type control information corresponding to the M transmission mode sets includes: selecting transmission mode sets associated with N pieces of first-type control information having the highest priorities as the N transmission mode sets; where the priority of the first-type control information is determined according to at least one of: acknowledgement (ACK)/non-acknowledgement (NACK) feedback information or channel state information feedback, a delay requirement of control information, a period characteristic of control information, or an information size characteristic of control information.

The step of determining the N transmission mode sets according to the priority order corresponding to the M transmission mode sets includes: selecting N transmission mode sets having the highest priorities from the M transmission mode sets.

The step of determining the N transmission mode sets according to the time domain density information corresponding to the M transmission mode sets includes: selecting N transmission mode sets corresponding to the highest time domain densities from the M transmission mode sets.

The step of determining the N transmission mode sets according to the receiving quality of the second signal corresponding to the M transmission mode sets includes: receiving second signals, selecting N second signals having the best receiving quality, and obtaining the N transmission mode sets according to receiving modes of the selected second signals.

Correspondingly, it is indicated that the transmission mode sets are used by the third communication node for sending the second signals.

A sounding reference signal (SRS) set may be configured with the same receiving beams so that the first communication node may select any one from the SRS set for sending. For example, an appropriate SRS is selected for sending based on the receiving quality of a downlink measurement reference signal.

In an embodiment, the N transmission mode sets includes a first transmission mode set and/or a second transmission mode set, where the step of determining the N transmission mode sets according to whether the predetermined condition is satisfied includes the following cases.

In response to determining that the predetermined condition is satisfied, it is determined to use the first transmission mode set or use the first transmission mode set and the second transmission mode set.

In response to determining that the predetermined condition is not satisfied, it is determined to use the second transmission mode set.

In an embodiment, whether the predetermined condition is satisfied is determined through at least one of the following manners.

The second-type control information is received, where the second-type control information indicates a receiving situation of a signal previously sent by a first communication node, and whether the predetermined condition is satisfied is determined according to the receiving situation.

The second-type control information is received, where the second-type control information indicates whether the predetermined condition is satisfied.

Whether the predetermined condition is satisfied is determined according to configuration information about a to-be-detected search space of a control channel in a time unit associated with the first signal.

Whether the predetermined condition is satisfied is determined according to configuration information about a to-be-detected transmission mode of the control channel in the time unit associated with the first signal.

Whether the predetermined condition is satisfied is determined according to configuration information about a to-be-detected receiving mode of the control channel in the time unit associated with the first signal.

Whether the predetermined condition is satisfied is determined according to configuration information about a detected search space where the control channel is located in the time unit associated with the first signal.

Whether the predetermined condition is satisfied is determined according to configuration information about a detected transmission mode of the control channel in the time unit associated with the first signal.

Whether the predetermined condition is satisfied is determined according to configuration information about a detected receiving mode of the control channel in the time unit associated with the first signal.

Whether the predetermined condition is satisfied is determined according to configuration information about a transmission mode of a second signal associated with the first signal in the time unit associated with the first signal.

Whether the predetermined condition is satisfied is determined according to configuration information about a receiving mode of the second signal associated with the first signal in the time unit associated with the first signal.

Whether the predetermined condition is satisfied is determined according to a signal type of the first signal.

When the first signal is the control channel, whether the predetermined condition is satisfied is determined according to a type of the control channel.

In an embodiment, the predetermined condition includes at least one of the following conditions.

The first signal is a retransmission signal.

A second signal associated with the first signal is the retransmission signal.

The second-type control information is detected in a first search space.

The second-type control information is detected in both the first search space and a second search space.

Configuration information about a to-be-detected search space of a control channel in a time unit associated with the first signal includes the first search space.

Configuration information about a to-be-detected transmission mode of the control channel in the time unit associated with the first signal includes a third transmission mode.

Configuration information about a to-be-detected receiving mode of the control channel in the time unit associated with the first signal includes a first receiving mode.

Configuration information about a detected search space where the control channel is located in the time unit associated with the first signal includes the first search space.

Configuration information about a detected transmission mode of the control channel in the time unit associated with the first signal includes the third transmission mode.

Configuration information about a detected receiving mode of the control channel in the time unit associated with the first signal includes the first receiving mode.

Configuration information about a transmission mode of the second signal associated with the first signal in the time unit associated with the first signal includes the third transmission mode.

Configuration information about a receiving mode of the second signal associated with the first signal in the time unit associated with the first signal includes the first receiving mode.

The first search space is associated with the first transmission mode set, and/or the first receiving mode is associated with the first transmission mode set, and/or the third transmission mode is associated with the first transmission mode set; and/or the second search space is associated with the second transmission mode set.

In an embodiment, the time unit associated with the first signal includes at least one of the following:

a time unit where the first signal is located;

a time unit where the second signal associated with the first signal is located; or a time unit belonging to an agreed time unit window.

In an embodiment, the second signal is a signal received by the first communication node.

The second signal includes at least one of the following signals: the control channel signal, the data channel signal, a demodulation reference signal, or the measurement reference signal.

The first signal includes response information about the second signal, or the second signal includes configuration information about the first signal, or the configuration information about the first signal includes relevant information about the second signal.

The response information includes ACK/NACK information or channel state feedback information.

In an embodiment, the first communication node sends the first signal to the second communication node by using the N transmission mode sets in at least one included combination of the following manners:

The first signal is sent in a time division manner by using the N transmission mode sets.

The first signal is sent in a frequency division manner by using the N transmission mode sets.

One transmission mode corresponds to one demodulation reference signal port group, and the first signal is sent on each port of the one demodulation reference signal port group by using the one transmission mode.

A plurality of transmission modes correspond to one demodulation reference signal port, and the first signal is sent on the one demodulation reference signal port by using the plurality of transmission modes.

One transmission mode corresponds to one antenna port group, and the first signal is sent on each port of the one antenna port group by using the one transmission mode.

The number of time granularities occupied by the N transmission mode sets is determined according to a value of N and the number of demodulation reference signal ports or of sending antenna ports allocated to the first signal.

The transmission mode sets of the first signal at different time domain granularities may be different, or the joint channel estimation cannot be performed on the same demodulation reference signal port over units with different time domain granularities.

In an embodiment, demodulation reference signal pattern information about the first signal is determined according to a value of N and the number of demodulation reference signal ports or sending antenna ports allocated to the first signal.

Alternatively, the demodulation reference signal pattern information about the first signal is determined according to the value of N.

In an embodiment, the N transmission mode sets satisfy one of the following characteristics.

The N transmission mode sets include a first transmission mode set and a second transmission mode set, where information about the first signal sent in the first transmission mode set is a subset of information sent in the second transmission mode set.

Information about the first signal sent in different transmission mode sets among the N transmission mode sets is the same.

The information about the first signal sent in the different transmission mode sets among the N transmission mode sets is different.

In an embodiment, before the first communication node acquires the M transmission mode sets, the method further includes: determining an acquisition mode for the M transmission mode sets.

In an embodiment, the acquisition mode for the M transmission mode sets is determined in one of the following manners.

The acquisition mode is determined according to a type of the first signal.

Second-type control information is received, where the second-type control information indicates the acquisition mode.

The acquisition mode is determined according to indication information about whether uplink and downlink reciprocity is established.

When the first signal is a first control channel signal, the acquisition mode is determined according to a type of the first control channel signal.

In an embodiment, the method further includes that the first communication node receives a plurality of pieces of configuration information, where different configuration information includes configuration information about different types of first signals; and/or that the first communication node receives a plurality of pieces of configuration information, where different configuration information includes configuration information about different types of first control channels; where the first signal is a first control channel signal.

The plurality of pieces of configuration information includes at least one of: configuration information about a transmission mode of the first signal or a first control channel, configuration information about an acquisition mode for the transmission mode of the first signal or the first control channel, or configuration information about a determination manner of the N transmission modes corresponding to the first signal or the first control channel from the M transmission mode sets.

In an embodiment, the type of the first control channel signal includes at least one of the following types.

The first control channel is periodically sent.

The first control channel is periodically sent.

The first control channel is semi-periodically sent.

A time domain of the first control channel is less than a predetermined threshold.

The time domain of the first control channel is greater than the predetermined threshold, where the first control channel includes data channel response information.

The first control channel includes channel state feedback information.

The first control channel is a control channel over a first network.

The first control channel is a control channel over a second network.

Duration of the first control channel is less than a predetermined threshold.

The duration of the first control channel is greater than the predetermined threshold.

The first control channel is a long-format control channel.

The first control channel is a short-format control channel.

The first network may be LTE and the second network may be NR, and of course other networks are not excluded.

In an embodiment, the first signal satisfies at least one of the following characteristics.

A transmission mode of the first signal and a transmission mode of a second signal share configuration information.

The transmission mode of the first signal and a receiving mode of the second signal share configuration information.

A transmission direction of the first signal is different from a transmission direction of the second signal.

Sharing of the configuration information indicates that merely one is notified in the configuration information, and information about the other may be derived from the one in the configuration information; or one set is notified in the configuration information and may be configured for the first signal and may be configured for the second signal.

In an embodiment, the first signal satisfies at least one of the following characteristics.

The transmission mode of the first signal and the transmission mode of the second signal share the configuration information, where resource granularities corresponding to different transmission modes of the first signal in the configuration information are different from resource granularities corresponding to different transmission modes of the second signal in the configuration information.

The transmission mode of the first signal and the receiving mode of the second signal share the configuration information, where resource granularities corresponding to different transmission modes of the first signal in the configuration information are different from resource granularities corresponding to different receiving modes of the second signal in the configuration information.

The transmission mode of the first signal and the transmission mode of the second signal share the configuration information, where resource proportions occupied by the different transmission modes of the first signal in the configuration information are different from resource proportions occupied by the different transmission modes of the second signal in the configuration information.

The transmission mode of the first signal and the receiving mode of the second signal share the configuration information, where resource proportions occupied by the different transmission modes of the first signal in the configuration information are different from resource proportions occupied by the different receiving modes of the second signal in the configuration information. The transmission mode of the first signal and the transmission mode of the second signal share the configuration information, where multiplexing manners of the different transmission modes of the first signal in the configuration information are different from multiplexing manners of the different transmission modes of the second signal in the configuration information.

The transmission mode of the first signal and the receiving mode of the second signal share the configuration information, where multiplexing manners of the different transmission modes of the first signal in the configuration information are different from multiplexing manners of the different receiving modes of the second signal in the configuration information.

A resource includes at least one of the following resources: a time domain resource, a frequency domain resource or a reference signal port resource.

The multiplexing manner includes time division multiplexing, frequency division multiplexing, code division multiplexing and space division multiplexing.

The embodiments of the present disclosure further provide a control information sending method. The method includes steps described below.

A third communication node sends at least one piece of second-type control information to a first communication node so that the first communication node acquires M transmission mode sets and/or determines N transmission mode sets for sending a first signal from the M transmission mode sets.

One transmission mode set includes at least one transmission mode, M is a natural number, and N is a natural number less than or equal to M.

In an embodiment, the method further includes a step described below.

The third communication node receives, according to the at least one piece of second-type control information, the first signal sent by the first communication node.

In an embodiment, when the third communication node sends the at least one piece of second-type control information to the first communication node so that the first communication node acquires the M transmission mode sets, the at least one piece of second-type control information has at least one of the following characteristics.

The second-type control information includes information about a transmission mode set of a control channel signal sent by the third communication node.

The second-type control information includes information about a receiving mode set of the control channel signal received by the first communication node.

The second-type control information includes a plurality of pieces of control information, and the M transmission mode sets are obtained according to the plurality of pieces of control information.

The second-type control information includes first control information and second control information, where the first control information indicates information about a transmission mode resource pool shared by different signal types, the second control information indicates information about the M transmission mode sets, and the M transmission mode sets belong to the transmission mode resource pool.

The second-type control information includes information about a first reference signal.

The second-type control information includes information about a second reference signal.

The second-type control information includes information about a synchronization signal.

The second-type control information includes configuration information about a search space of a control channel.

The second-type control information triggers sending of information about the first signal and retransmission joint coding of a second signal associated with the first signal by using a multi-transmission mode set.

The second-type control information indicates a group of information about the first reference signal or a group of information about the second reference signal.

A transmission direction of the first reference signal is different from a transmission direction of the second reference signal.

The transmission direction of the first reference signal is the same as a transmission direction of the first signal, and the transmission direction of the second reference signal is different from the transmission direction of the first signal.

In an embodiment, the step in which the third communication node sends the at least one piece of second-type control information to the first communication node so that the first communication node determines the N transmission mode sets for sending the first signal from the M transmission mode sets includes a step described below.

The third communication node directly indicates, through the at least one piece of second-type control information, the N transmission mode sets for sending the first signal.

Alternatively, the third communication node sends second-type control information carrying an indication indicating a receiving situation of a signal previously sent by the first communication node to the first communication node so that the first communication node determines whether a predetermined condition is satisfied according to the receiving situation and thereby determines the N transmission mode sets.

Alternatively, the third communication node sends second-type control information carrying an indication indicating whether the predetermined condition is satisfied to the first communication node so that the first communication node determines the N transmission mode sets.

In an embodiment, the at least one piece of second-type control information satisfies at least one of the following characteristics.

The at least one piece of second-type control information further carries an indication indicating an acquisition mode so that the first communication node determines an acquisition mode for the M transmission mode sets.

The second-type control information includes a plurality of pieces of configuration information, where different configuration information includes configuration information about different types of signals.

The second-type control information includes a plurality of pieces of configuration information, where different configuration information includes configuration information about different types of first control channels.

The plurality of pieces of configuration information includes at least one of: configuration information about a transmission mode of the first signal or a first control channel, configuration information about an acquisition mode for the transmission mode of the first signal or the first control channel, or configuration information about a determination manner of the N transmission modes corresponding to the first signal or the first control channel from the M transmission mode sets.

In an embodiment, the first signal satisfies one of the following characteristics.

In the at least one piece of second-type control information, a transmission mode of the first signal and a transmission mode of a second signal share configuration information.

The transmission mode of the first signal and a receiving mode of the second signal share configuration information.

A transmission direction of the first signal is different from a transmission direction of the second signal.

Sharing of the configuration information indicates that merely one is notified in the configuration information, and information about the other may be derived from the one in the configuration information; or one set is notified in the configuration information and may be configured for the first signal and may be configured for the second signal.

In an embodiment, the first signal satisfies at least one of the following characteristics.

The transmission mode of the first signal and the transmission mode of the second signal share the configuration information, where resource granularities corresponding to different transmission modes of the first signal in the configuration information are different from resource granularities corresponding to different transmission modes of the second signal in the configuration information. The transmission mode of the first signal and the receiving mode of the second signal share the configuration information, where resource granularities corresponding to different transmission modes of the first signal in the configuration information are different from resource granularities corresponding to different receiving modes of the second signal in the configuration information.

The transmission mode of the first signal and the transmission mode of the second signal share the configuration information, where resource proportions occupied by the different transmission modes of the first signal in the configuration information are different from resource proportions occupied by the different transmission modes of the second signal in the configuration information.

The transmission mode of the first signal and the receiving mode of the second signal share the configuration information, where resource proportions occupied by the different transmission modes of the first signal in the configuration information are different from resource proportions occupied by the different receiving modes of the second signal in the configuration information. The transmission mode of the first signal and the transmission mode of the second signal share the configuration information, where multiplexing manners of the different transmission modes of the first signal in the configuration information are different from multiplexing manners of the different transmission modes of the second signal in the configuration information.

The transmission mode of the first signal and the receiving mode of the second signal share the configuration information, where multiplexing manners of the different transmission modes of the first signal in the configuration information are different from multiplexing manners of the different receiving modes of the second signal in the configuration information.

A resource includes a time domain resource, and/or a frequency domain resource, and/or a reference signal port resource.

The multiplexing manner includes time division multiplexing, frequency division multiplexing, code division multiplexing and space division multiplexing.

The embodiments of the present disclosure further provide a signal transmission method. The method includes steps described below.

A third communication node sends at least one piece of second-type control information to a first communication node.

The first communication node acquires, according to the at least one piece of second-type control information, M transmission mode sets and/or determines N transmission mode sets for sending a first signal from the M transmission mode sets.

The first communication node sends the first signal to a second communication node by using the N transmission mode sets.

The second communication node receives the first signal according to the N transmission mode sets.

One transmission mode set includes at least one transmission mode, M is a natural number, N is a natural number less than or equal to M, and the third communication node and the second communication node are a same communication node or different communication nodes.

In an embodiment, the method further includes that the third communication node receives, according to the at least one piece of second-type control information, the first signal sent by the first communication node.

In an embodiment, when the first communication node acquires the M transmission mode sets according to the at least one piece of second-type control information, the at least one piece of second-type control information has at least one of the following characteristics.

The second-type control information includes information about a transmission mode set of a control channel signal sent by the third communication node.

The second-type control information includes information about a receiving mode set of the control channel signal received by the first communication node.

The second-type control information includes a plurality of pieces of control information, and the M transmission mode sets are obtained according to the plurality of pieces of control information.

The second-type control information includes first control information and second control information, where the first control information indicates information about a transmission mode resource pool shared by different signal types, the second control information indicates information about the M transmission mode sets, and the M transmission mode sets belong to the transmission mode resource pool.

The second-type control information includes information about a first reference signal.

The second-type control information includes information about a second reference signal.

The second-type control information includes information about a synchronization signal.

The second-type control information includes configuration information about a search space of a control channel.

The second-type control information triggers sending of information about the first signal and retransmission joint coding of a second signal associated with the first signal by using a multi-transmission mode set.

The second-type control information indicates a group of information about the first reference signal or a group of information about the second reference signal.

A transmission direction of the first reference signal is different from a transmission direction of the second reference signal, where the transmission direction of the first reference signal is the same as a transmission direction of the first signal, and the transmission direction of the second reference signal is different from the transmission direction of the first signal.

In an embodiment, the step in which the third communication node sends the at least one piece of second-type control information to the first communication node and the first communication node determines, according to the at least one piece of second-type control information, the N transmission mode sets for sending the first signal from the M transmission mode sets includes a step described below.

The third communication node directly indicates, through the at least one piece of second-type control information, the N transmission mode sets for sending the first signal.

Alternatively, the third communication node sends second-type control information carrying an indication indicating a receiving situation of a signal previously sent by the first communication node to the first communication node, and the first communication node determines whether a predetermined condition is satisfied according to the receiving situation and thereby determines the N transmission mode sets.

Alternatively, the third communication node sends second-type control information carrying an indication indicating whether the predetermined condition is satisfied to the first communication node, and the first communication node determines the N transmission mode sets.

In an embodiment, the at least one piece of second-type control information satisfies at least one of the following characteristics.

The at least one piece of second-type control information further carries an indication indicating an acquisition mode, and the first communication node determines an acquisition mode for the M transmission mode sets according to the at least one piece of second-type control information.

The second-type control information includes a plurality of pieces of configuration information, where different configuration information includes configuration information about different types of signals.

The second-type control information includes a plurality of pieces of configuration information, where different configuration information includes configuration information about different types of first control channels.

The plurality of pieces of configuration information includes at least one of: configuration information about a transmission mode of the first signal or a first control channel, configuration information about an acquisition mode for the transmission mode of the first signal or the first control channel, or configuration information about a determination manner of the N transmission modes corresponding to the first signal or the first control channel from the M transmission mode sets.

In an embodiment, the first signal satisfies one of the following characteristics.

In the at least one piece of second-type control information, a transmission mode of the first signal and a transmission mode of a second signal share configuration information.

The transmission mode of the first signal and a receiving mode of the second signal share configuration information.

A transmission direction of the first signal is different from a transmission direction of the second signal.

In an embodiment, the first signal satisfies at least one of the following characteristics.

The transmission mode of the first signal and the transmission mode of the second signal share the configuration information, where resource granularities corresponding to different transmission modes of the first signal in the configuration information are different from resource granularities corresponding to different transmission modes of the second signal in the configuration information.

The transmission mode of the first signal and the receiving mode of the second signal share the configuration information, where resource granularities corresponding to different transmission modes of the first signal in the configuration information are different from resource granularities corresponding to different receiving modes of the second signal in the configuration information.

The transmission mode of the first signal and the transmission mode of the second signal share the configuration information, where resource proportions occupied by the different transmission modes of the first signal in the configuration information are different from resource proportions occupied by the different transmission modes of the second signal in the configuration information.

The transmission mode of the first signal and the receiving mode of the second signal share the configuration information, where resource proportions occupied by the different transmission modes of the first signal in the configuration information are different from resource proportions occupied by the different receiving modes of the second signal in the configuration information. The transmission mode of the first signal and the transmission mode of the second signal share the configuration information, where multiplexing manners of the different transmission modes of the first signal in the configuration information are different from multiplexing manners of the different transmission modes of the second signal in the configuration information.

The transmission mode of the first signal and the receiving mode of the second signal share the configuration information, where multiplexing manners of the different transmission modes of the first signal in the configuration information are different from multiplexing manners of the different receiving modes of the second signal in the configuration information.

A resource includes at least one of the following resources: a time domain resource, a frequency domain resource or a reference signal port resource.

Figure 2:
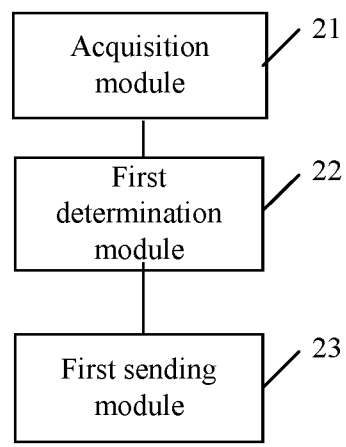
FIG. 2 is a schematic diagram of a signal transmission apparatus according to an embodiment of the present disclosure.

As shown in FIG. 2, the embodiments of the present disclosure further provide a signal transmission apparatus. The apparatus includes: an acquisition module 21, a first determination module 22 and a first sending module 23.

The acquisition module 21 is configured to acquire M transmission mode sets.

The first determination module 22 is configured to determine N transmission mode sets for sending a first signal from the M transmission mode sets acquired by the acquisition module 21.

The first sending module 23 is configured to send the first signal to a second communication node by using the N transmission mode sets determined by the first determination module 22.

One transmission mode set includes at least one transmission mode, M is a natural number, and N is a natural number less than or equal to M.

In an embodiment, the first signal is at least one of the following signals: a control channel signal, a data channel signal, a demodulation reference signal, or a measurement reference signal.

In an embodiment, the acquisition module is configured to acquire the M transmission mode sets in at least one of the following manners.

The M transmission mode sets are obtained by acquiring transmission modes associated with a plurality of pieces of first-type control information included in the first signal.

Second-type control information is received, and the M transmission mode sets are obtained according to the second-type control information.

The M transmission mode sets are obtained according to configuration information about a to-be-detected search space of a control channel in a time unit associated with the first signal.

The M transmission mode sets are obtained according to configuration information about a to-be-detected transmission mode of the control channel in the time unit associated with the first signal.

The M transmission mode sets are obtained according to configuration information about a to-be-detected receiving mode of the control channel in the time unit associated with the first signal.

The M transmission mode sets are obtained according to configuration information about a detected search space where the control channel is located in the time unit associated with the first signal.

The M transmission mode sets are obtained according to configuration information about a detected transmission mode of the control channel in the time unit associated with the first signal.

The M transmission mode sets are obtained according to configuration information about a detected receiving mode of the control channel in the time unit associated with the first signal.

The M transmission mode sets are obtained by acquiring a transmission mode of a second signal associated with the first signal.

The M transmission mode sets are obtained by acquiring a receiving mode of the second signal associated with the first signal.

Information about the M transmission mode sets is acquired in an implicit manner.

In an embodiment, the acquisition module is configured to receive the second-type control information and obtain the M transmission mode sets according to the second-type control information in at least one of following included manners.

The second-type control information includes information about a transmission mode set of a control channel signal sent by a third communication node, and the first communication node obtains the M transmission mode sets according to the transmission mode set of the control channel signal sent by the third communication node; where the third communication node and the second communication node are a same communication node or different communication nodes.

The second-type control information includes information about a receiving mode set of the control channel signal received by the first communication node, and the first communication node obtains the M transmission mode sets according to the information about the receiving mode set of the control channel signal received by the first communication node.

The second-type control information includes a plurality of pieces of control information, and the M transmission mode sets are obtained according to the plurality of pieces of control information.

The second-type control information includes first control information and second control information, where the first control information indicates information about a transmission mode resource pool shared by different signal types, the second control information indicates the information about the M transmission mode sets, and the M transmission mode sets belong to the transmission mode resource pool.

The second-type control information includes information about a first reference signal, and the first communication node acquires the information about the M transmission mode sets according to the first reference signal.

The second-type control information includes information about a second reference signal, and the first communication node acquires the information about the M transmission mode sets according to the second reference signal.

The second-type control information includes information about a synchronization signal, and the first communication node acquires the information about the M transmission mode sets according to the information about the synchronization signal.

The second-type control information is configured for triggering sending of information about the first signal and retransmission joint coding of the second signal associated with the first signal by using a multi-transmission mode set.

The second-type control information indicates information about a group of first reference signals or information about a group of second reference signals, and the first communication node acquires the M transmission mode sets according to the group of first reference signals or the group of second reference signals.

The transmission direction of the first reference signal is the same as a transmission direction of the first signal, and the transmission direction of the second reference signal is different from the transmission direction of the first signal.

In an embodiment, the first determination module is configured to determine the N transmission mode sets for sending the first signal from the M transmission mode sets by using at least one combination of the following manners.

Second-type control information is received, and the N transmission mode sets among the M transmission mode sets are determined according to an indication of the second-type control information.

The N transmission mode sets are determined according to time information corresponding to the M transmission mode sets.

The N transmission mode sets are determined according to a type of a second signal corresponding to the M transmission mode sets.

The N transmission mode sets are determined according to a type of first-type control information corresponding to the M transmission mode sets.

The N transmission mode sets are determined according to a priority order corresponding to the M transmission mode sets.

The N transmission mode sets are determined according to time domain density information corresponding to the M transmission mode sets.

The N transmission mode sets are determined according to receiving quality of the second signal corresponding to the M transmission mode sets.

The N transmission mode sets are determined according to whether a predetermined condition is satisfied.

The N transmission mode sets are determined according to information about a resource occupied by the first signal, where the information about the resource includes at least one of the following resources: a time domain resource, a frequency domain resource, a demodulation reference signal port resource or a sending antenna port resource.

In an embodiment, the step of determining the N transmission mode sets according to the time information corresponding to the M transmission mode sets includes: selecting N transmission mode sets corresponding to the latest time from the M transmission mode sets; where time corresponding to the one transmission mode set is time at which a second signal corresponding to the at least one transmission mode of the one transmission mode set is located, or the time corresponding to the one transmission mode set is time at which the first communication node acquires the at least one transmission mode of the one transmission mode set.

The step of determining the N transmission mode sets according to the type of the second signal corresponding to the M transmission mode sets includes: selecting transmission mode sets corresponding to a second signal having a high priority as the N transmission mode sets according to a priority of the type of the second signal, where the type of the second signal includes: a control channel signal, a data channel signal and a measurement reference signal, where the control channel signal, the data channel signal and the measurement reference signal are in descending order of priority.

The step of determining the N transmission mode sets according to the type of the first-type control information corresponding to the M transmission mode sets includes: selecting transmission mode sets associated with N pieces of first-type control information having the highest priorities as the N transmission mode sets; where the priority of the first-type control information is determined according to at least one of: ACK/NACK feedback information or channel state information feedback, a delay requirement of control information, a period characteristic of control information, or an information size characteristic of control information.

The step of determining the N transmission mode sets according to the priority order corresponding to the M transmission mode sets includes: selecting N transmission mode sets having the highest priorities from the M transmission mode sets.

The step of determining the N transmission mode sets according to the time domain density information corresponding to the M transmission mode sets includes: selecting N transmission mode sets corresponding to the highest time domain densities from the M transmission mode sets.

The step of determining the N transmission mode sets according to the receiving quality of the second signal corresponding to the M transmission mode sets includes: receiving second signals, selecting N second signals having the best receiving quality, and obtaining the N transmission mode sets according to receiving modes of the selected second signals.

In an embodiment, the N transmission mode sets includes a first transmission mode set and/or a second transmission mode set, where the step of determining the N transmission mode sets according to whether the predetermined condition is satisfied includes the following cases.

In response to determining that the predetermined condition is satisfied, it is determined to use the first transmission mode set or use the first transmission mode set and the second transmission mode set.

In response to determining that the predetermined condition is not satisfied, it is determined to use the second transmission mode set.

In an embodiment, whether the predetermined condition is satisfied is determined through at least one of the following manners.

The second-type control information is received, where the second-type control information indicates a receiving situation of a signal previously sent by a first communication node, and whether the predetermined condition is satisfied is determined according to the receiving situation.

The second-type control information is received, where the second-type control information indicates whether the predetermined condition is satisfied.

Whether the predetermined condition is satisfied is determined according to configuration information about a to-be-detected search space of a control channel in a time unit associated with the first signal.

Whether the predetermined condition is satisfied is determined according to configuration information about a to-be-detected transmission mode of the control channel in the time unit associated with the first signal.

Whether the predetermined condition is satisfied is determined according to configuration information about a to-be-detected receiving mode of the control channel in the time unit associated with the first signal.

Whether the predetermined condition is satisfied is determined according to configuration information about a detected search space where the control channel is located in the time unit associated with the first signal.

Whether the predetermined condition is satisfied is determined according to configuration information about a detected transmission mode of the control channel in the time unit associated with the first signal.

Whether the predetermined condition is satisfied is determined according to configuration information about a detected receiving mode of the control channel in the time unit associated with the first signal.

Whether the predetermined condition is satisfied is determined according to configuration information about a transmission mode of a second signal associated with the first signal in the time unit associated with the first signal.

Whether the predetermined condition is satisfied is determined according to configuration information about a receiving mode of the second signal associated with the first signal in the time unit associated with the first signal.

Whether the predetermined condition is satisfied is determined according to a signal type of the first signal.

When the first signal is the control channel, whether the predetermined condition is satisfied is determined according to a type of the control channel.

In an embodiment, the predetermined condition includes at least one of the following conditions.

The first signal is a retransmission signal.

A second signal associated with the first signal is the retransmission signal.

The second-type control information is detected in a first search space.

The second-type control information is detected in both the first search space and a second search space.

Configuration information about a to-be-detected search space of a control channel in a time unit associated with the first signal includes the first search space.

Configuration information about a to-be-detected transmission mode of the control channel in the time unit associated with the first signal includes a third transmission mode.

Configuration information about a to-be-detected receiving mode of the control channel in the time unit associated with the first signal includes a first receiving mode.

Configuration information about a detected search space where the control channel is located in the time unit associated with the first signal includes the first search space.

Configuration information about a detected transmission mode of the control channel in the time unit associated with the first signal includes the third transmission mode.

Configuration information about a detected receiving mode of the control channel in the time unit associated with the first signal includes the first receiving mode.

Configuration information about a transmission mode of the second signal associated with the first signal in the time unit associated with the first signal includes the third transmission mode.

Configuration information about a receiving mode of the second signal associated with the first signal in the time unit associated with the first signal includes the first receiving mode.

The first search space is associated with the first transmission mode set, and/or the first receiving mode is associated with the first transmission mode set, and/or the third transmission mode is associated with the first transmission mode set; and/or the second search space is associated with the second transmission mode set.

In an embodiment, the time unit associated with the first signal is at least one of the following time units: a time unit where the first signal is located; a time unit where the second signal associated with the first signal is located; or a time unit belonging to an agreed time unit window.

In an embodiment, the second signal is a signal received by the first communication node.

The second signal includes at least one of the following signals: the control channel signal, the data channel signal, a demodulation reference signal, or the measurement reference signal.

The first signal includes response information about the second signal, or the second signal includes configuration information about the first signal, or the configuration information about the first signal includes relevant information about the second signal.

In an embodiment, the first sending module is configured to send the first signal to the second communication node by using the N transmission mode sets through at least one combination of the following manners.

The first signal is sent in a time division manner by using the N transmission mode sets.

The first signal is sent in a frequency division manner by using the N transmission mode sets.

One transmission mode corresponds to one demodulation reference signal port group, and the first signal is sent on each port of the one demodulation reference signal port group in the corresponding one transmission mode.

A plurality of transmission modes correspond to one demodulation reference signal port, and the first signal is sent on the one demodulation reference signal port in the corresponding plurality of transmission modes.

One transmission mode corresponds to one antenna port group, and the first signal is sent on each port of the one antenna port group in the corresponding one transmission mode.

The number of time granularities occupied by the N transmission mode sets is determined according to a value of N and the number of demodulation reference signal ports or sending antenna ports allocated to the first signal.

In an embodiment, the first determination module is further configured to perform an operation described below.

Demodulation reference signal pattern information about the first signal is determined according to a value of N and the number of demodulation reference signal ports or sending antenna ports allocated to the first signal.

Alternatively, the demodulation reference signal pattern information about the first signal is determined according to the value of N.

In an embodiment, the N transmission mode sets satisfy one of the following characteristics.

The N transmission mode sets include a first transmission mode set and a second transmission mode set, where information about the first signal sent in the first transmission mode set is a subset of information sent in the second transmission mode set.

Information about the first signal sent in different transmission mode sets among the N transmission mode sets is the same.

The information about the first signal sent in the different transmission mode sets among the N transmission mode sets is different.

In an embodiment, the apparatus further includes: a second determination module configured to perform an operation described below.

An acquisition mode for the M transmission mode sets is determined.

In an embodiment, the acquisition mode for the M transmission mode sets is determined in one of the following manners.

The acquisition mode is determined according to a type of the first signal.

Second-type control information is received, where the second-type control information indicates the acquisition mode.

The acquisition mode is determined according to indication information about whether uplink and downlink reciprocity is established.

When the first signal is a first control channel signal, the acquisition mode is determined according to a type of the first control channel signal.

In an embodiment, a reception module is further included and is configured to: receive a plurality of pieces of configuration information, where different configuration information includes configuration information about different types of first signals; and/or receive a plurality of pieces of configuration information, where different configuration information includes configuration information about different types of first control channels; where the first signal is a first control channel signal.

The plurality of pieces of configuration information includes at least one of: configuration information about a transmission mode of the first signal or a first control channel, configuration information about an acquisition mode for the transmission mode of the first signal or the first control channel, or configuration information about a determination manner of the N transmission modes corresponding to the first signal or the first control channel from the M transmission mode sets.

In an embodiment, the type of the first control channel signal includes at least one of the following types.

The first control channel is periodically sent.
The first control channel is aperiodically sent.
The first control channel is semi-periodically sent.
A time domain of the first control channel is less than a predetermined threshold.
The time domain of the first control channel is greater than the predetermined threshold, where the first control channel includes data channel response information.
The first control channel includes channel state feedback information.
The first control channel is a control channel over a first network.
The first control channel is a control channel over a second network.
Duration of the first control channel is less than a predetermined threshold.
The duration of the first control channel is greater than the predetermined threshold.
The first control channel is a long-format control channel.
The first control channel is a short-format control channel.

In an embodiment, the first signal satisfies at least one of the following characteristics.

A transmission mode of the first signal and a transmission mode of a second signal share configuration information.
The transmission mode of the first signal and a receiving mode of the second signal share configuration information.
A transmission direction of the first signal is different from a transmission direction of the second signal.

In an embodiment, the first signal satisfies at least one of the following characteristics.

The transmission mode of the first signal and the transmission mode of the second signal share the configuration information, where resource granularities corresponding to different transmission modes of the first signal in the configuration information are different from resource granularities corresponding to different transmission modes of the second signal in the configuration information.

The transmission mode of the first signal and the receiving mode of the second signal share the configuration information, where resource granularities corresponding to different transmission modes of the first signal in the configuration information are different from resource granularities corresponding to different receiving modes of the second signal in the configuration information.

The transmission mode of the first signal and the transmission mode of the second signal share the configuration information, where resource proportions occupied by the different transmission modes of the first signal in the configuration information are different from resource proportions occupied by the different transmission modes of the second signal in the configuration information.

The transmission mode of the first signal and the receiving mode of the second signal share the configuration information, where resource proportions occupied by the different transmission modes of the first signal in the configuration information are different from resource proportions occupied by the different receiving modes of the second signal in the configuration information.

The transmission mode of the first signal and the transmission mode of the second signal share the configuration information, where multiplexing manners of the different transmission modes of the first signal in the configuration information are different from multiplexing manners of the different transmission modes of the second signal in the configuration information.

The transmission mode of the first signal and the receiving mode of the second signal share the configuration information, where multiplexing manners of the different transmission modes of the first signal in the configuration information are different from multiplexing manners of the different receiving modes of the second signal in the configuration information.

A resource includes at least one of the following resources: a time domain resource, a frequency domain resource or a reference signal port resource.

It is to be noted that: the above-mentioned embodiment provides a signal transmission apparatus which, when sending a signal, is exemplified merely by the division of the above-mentioned program modules, and in practical applications, the above-mentioned processing may be distributed and performed by different program modules according to needs, that is, the internal structure of the apparatus is divided into different program modules to perform all or part of the above-mentioned processing. In addition, the signal transmission apparatus in the above-mentioned embodiment has the same concept as the signal transmission method in the method embodiment, and a specific implementation process refers to that in the method embodiment, which is not repeated herein.

The embodiments of the present disclosure further provide a control information sending apparatus. The apparatus includes a second sending module.

The second sending module is configured to send at least one piece of second-type control information to a first communication node so that the first communication node acquires M transmission mode sets and/or determines N transmission mode sets for sending a first signal from the M transmission mode sets.

One transmission mode set includes at least one transmission mode, M is a natural number, and N is a natural number less than or equal to M.

In an embodiment, the apparatus further includes: a first reception module configured to receive, according to the at least one piece of second-type control information, the first signal sent by the first communication node.

In an embodiment, when the second sending module sends the at least one piece of second-type control information to the first communication node so that the first communication node acquires the M transmission mode sets, the at least one piece of second-type control information has at least one of the following characteristics.

The second-type control information includes information about a transmission mode set of a control channel signal sent by the third communication node.

The second-type control information includes information about a receiving mode set of the control channel signal received by the first communication node.

The second-type control information includes a plurality of pieces of control information, and the M transmission mode sets are obtained according to the plurality of pieces of control information.

The second-type control information includes first control information and second control information, where the first control information indicates information about a transmission mode resource pool shared by different signal types, the second control information indicates information about the M transmission mode sets, and the M transmission mode sets belong to the transmission mode resource pool.

The second-type control information includes information about a first reference signal.

The second-type control information includes information about a second reference signal.

The second-type control information includes information about a synchronization signal.

The second-type control information includes configuration information about a search space of a control channel.

The second-type control information triggers sending of information about the first signal and retransmission joint coding of a second signal associated with the first signal by using a multi-transmission mode set.

The second-type control information indicates a group of information about the first reference signal or a group of information about the second reference signal.

A transmission direction of the first reference signal is different from a transmission direction of the second reference signal.

The transmission direction of the first reference signal is the same as a transmission direction of the first signal, and the transmission direction of the second reference signal is different from the transmission direction of the first signal.

In an embodiment, the step in which the second sending module sends the at least one piece of second-type control information to the first communication node so that the first communication node determines the N transmission mode sets for sending the first signal from the M transmission mode sets includes a step described below.

The N transmission mode sets for sending the first signal are directly indicated through the at least one piece of second-type control information.

Alternatively, second-type control information carrying an indication indicating a receiving situation of a signal previously sent by the first communication node is sent to the first communication node so that the first communication node determines whether a predetermined condition is satisfied according to the receiving situation and thereby determines the N transmission mode sets.

Alternatively, second-type control information carrying an indication indicating whether the predetermined condition is satisfied is sent to the first communication node so that the first communication node determines the N transmission mode sets.

In an embodiment, the at least one piece of second-type control information satisfies at least one of the following characteristics.

The at least one piece of second-type control information further carries an indication indicating an acquisition mode so that the first communication node determines an acquisition mode for the M transmission mode sets.

The second-type control information includes a plurality of pieces of configuration information, where different configuration information includes configuration information about different types of signals.

The second-type control information includes a plurality of pieces of configuration information, where different configuration information includes configuration information about different types of first control channels.

The plurality of pieces of configuration information includes at least one of: configuration information about a transmission mode of the first signal or a first control channel, configuration information about an acquisition mode for the transmission mode of the first signal or the first control channel, or configuration information about a determination manner of the N transmission modes corresponding to the first signal or the first control channel from the M transmission mode sets.

In an embodiment, the first signal satisfies one of the following characteristics.

In the at least one piece of second-type control information, a transmission mode of the first signal and a transmission mode of a second signal share configuration information.

The transmission mode of the first signal and a receiving mode of the second signal share configuration information.

A transmission direction of the first signal is different from a transmission direction of the second signal.

In an embodiment, the first signal satisfies at least one of the following characteristics.

The transmission mode of the first signal and the transmission mode of the second signal share the configuration information, where resource granularities corresponding to different transmission modes of the first signal in the configuration information are different from resource granularities corresponding to different transmission modes of the second signal in the configuration information.

The transmission mode of the first signal and the receiving mode of the second signal share the configuration information, where resource granularities corresponding to different transmission modes of the first signal in the configuration information are different from resource granularities corresponding to different receiving modes of the second signal in the configuration information.

The transmission mode of the first signal and the transmission mode of the second signal share the configuration information, where resource proportions occupied by the different transmission modes of the first signal in the configuration information are different from resource proportions occupied by the different transmission modes of the second signal in the configuration information.

The transmission mode of the first signal and the receiving mode of the second signal share the configuration information, where resource proportions occupied by the different transmission modes of the first signal in the configuration information are different from resource proportions occupied by the different receiving modes of the second signal in the configuration information.

The transmission mode of the first signal and the transmission mode of the second signal share the configuration information, where multiplexing manners of the different transmission modes of the first signal in the configuration information are different from multiplexing manners of the different transmission modes of the second signal in the configuration information.

The transmission mode of the first signal and the receiving mode of the second signal share the configuration information, where multiplexing manners of the different transmission modes of the first signal in the configuration information are different from multiplexing manners of the different receiving modes of the second signal in the configuration information.

A resource includes at least one of the following resources: a time domain resource, a frequency domain resource or a reference signal port resource.

The embodiments of the present disclosure further provide a signal transmission system. The system includes: a first communication node, a second communication node and a third communication node, where the third communication node and the second communication node are a same communication node or different communication nodes.

The third communication node is configured to send at least one piece of second-type control information to the first communication node.

The first communication node is configured to acquire, according to the at least one piece of second-type control information, M transmission mode sets and/or determine N transmission mode sets for sending a first signal from the M transmission mode sets.

The first communication node is configured to send the first signal to the second communication node by using the N transmission mode sets.

The second communication node is configured to receive the first signal according to the N transmission mode sets.

One transmission mode set includes at least one transmission mode, M is a natural number, and N is a natural number less than or equal to M.

In an embodiment, when the first communication node acquires the M transmission mode sets according to the at least one piece of second-type control information, the at least one piece of second-type control information has at least one of the following characteristics.

The second-type control information includes information about a transmission mode set of a control channel signal sent by the third communication node.

The second-type control information includes information about a receiving mode set of the control channel signal received by the first communication node.

The second-type control information includes a plurality of pieces of control information, and the M transmission mode sets are obtained according to the plurality of pieces of control information.

The second-type control information includes first control information and second control information, where the first control information indicates information about a transmission mode resource pool shared by different signal types, the second control information indicates information about the M transmission mode sets, and the M transmission mode sets belong to the transmission mode resource pool.

The second-type control information includes information about a first reference signal.

The second-type control information includes information about a second reference signal.

The second-type control information includes information about a synchronization signal.

The second-type control information includes configuration information about a search space of a control channel.

The second-type control information triggers sending of information about the first signal and retransmission joint coding of a second signal associated with the first signal by using a multi-transmission mode set.

The second-type control information indicates a group of information about the first reference signal or a group of information about the second reference signal.

A transmission direction of the first reference signal is different from a transmission direction of the second reference signal; and the transmission direction of the first reference signal is the same as a transmission direction of the first signal, and the transmission direction of the second reference signal is different from the transmission direction of the first signal.

In an embodiment, when the third communication node sends the at least one piece of second-type control information to the first communication node, and the first communication node determines, according to the at least one piece of second-type control information, the N transmission mode sets for sending the first signal from the M transmission mode sets, the third communication node is configured to directly indicate, through the at least one piece of second-type control information, the N transmission mode sets for sending the first signal; or the third communication node is configured to send second-type control information carrying an indication indicating a receiving situation of a signal previously sent by the first communication node to the first communication node, and the first communication node determines whether a predetermined condition is satisfied according to the receiving situation and thereby determines the N transmission mode sets; or the third communication node is configured to send second-type control information carrying an indication indicating whether the predetermined condition is satisfied to the first communication node, and the first communication node determines the N transmission mode sets.

In an embodiment, the at least one piece of second-type control information satisfies at least one of the following characteristics.

The at least one piece of second-type control information further carries an indication indicating an acquisition mode, and the first communication node determines an acquisition mode for the M transmission mode sets according to the at least one piece of second-type control information.

The second-type control information includes a plurality of pieces of configuration information, where different configuration information includes configuration information about different types of signals.

The second-type control information includes a plurality of pieces of configuration information, where different configuration information includes configuration information about different types of first control channels.

The plurality of pieces of configuration information includes at least one of: configuration information about a transmission mode of the first signal or a first control channel, configuration information about an acquisition mode for the transmission mode of the first signal or the first control channel, or configuration information about a determination manner of the N transmission modes corresponding to the first signal or the first control channel from the M transmission mode sets.

In an embodiment, the first signal satisfies one of the following characteristics.

In the at least one piece of second-type control information, a transmission mode of the first signal and a transmission mode of a second signal share configuration information.

The transmission mode of the first signal and a receiving mode of the second signal share configuration information.

A transmission direction of the first signal is different from a transmission direction of the second signal.

In an embodiment, the first signal satisfies at least one of the following characteristics.

The transmission mode of the first signal and the transmission mode of the second signal share the configuration information, where resource granularities corresponding to different transmission modes of the first signal in the configuration information are different from resource granularities corresponding to different transmission modes of the second signal in the configuration information.

The transmission mode of the first signal and the receiving mode of the second signal share the configuration information, where resource granularities corresponding to different transmission modes of the first signal in the configuration information are different from resource granularities corresponding to different receiving modes of the second signal in the configuration information.

The transmission mode of the first signal and the transmission mode of the second signal share the configuration information, where resource proportions occupied by the different transmission modes of the first signal in the configuration information are different from resource proportions occupied by the different transmission modes of the second signal in the configuration information.

The transmission mode of the first signal and the receiving mode of the second signal share the configuration information, where resource proportions occupied by the different transmission modes of the first signal in the configuration information are different from resource proportions occupied by the different receiving modes of the second signal in the configuration information.

The transmission mode of the first signal and the transmission mode of the second signal share the configuration information, where multiplexing manners of the different transmission modes of the first signal in the configuration information are different from multiplexing manners of the different transmission modes of the second signal in the configuration information.

The transmission mode of the first signal and the receiving mode of the second signal share the configuration information, where multiplexing manners of the different transmission modes of the first signal in the configuration information are different from multiplexing manners of the different receiving modes of the second signal in the configuration information.

A resource includes at least one of the following resources: a time domain resource, a frequency domain resource or a reference signal port resource.

It is to be noted that: the above-mentioned embodiment provides a control information sending apparatus which, when sending control information, is exemplified merely by the division of the above-mentioned program modules, and in practical applications, the above-mentioned processing may be distributed and performed by different program modules according to needs, that is, the internal structure of the apparatus is divided into different program modules to perform all or part of the above-mentioned processing. In addition, the control information sending apparatus in the above-mentioned embodiment has the same concept as the control information sending method in the method embodiment, and a specific implementation process refers to that in the method embodiment, which is not repeated herein.

Application examples are described below.

Application Example 1

In the present application example, a terminal (i.e., the second communication node) selects N sending beam sets (i.e., the N transmission mode sets) from M sending beam sets (i.e., transmission mode sets) for sending an uplink control channel. M is a natural number, and N is a natural number less than or equal to M.

Figure 3:
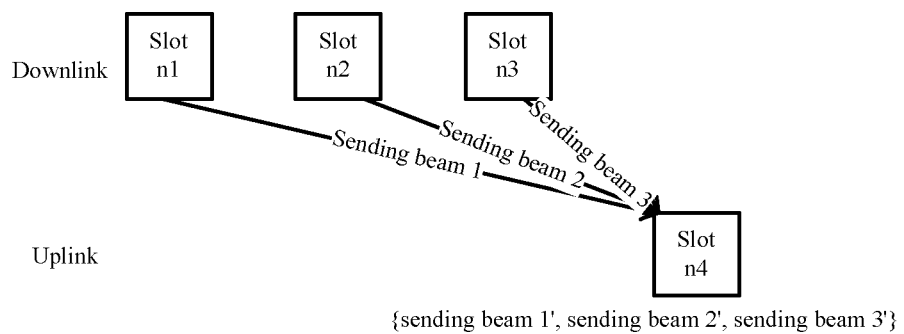
FIG. 3 is an exemplary diagram of acquiring M transmission mode sets through transmission modes of a downlink control channel according to an application example of the present disclosure.

As shown in FIG. 3, the terminal receives a downlink data channel and/or a downlink measurement reference signal on {slotn1, slotn2, slotn3} (where a slot denotes a time slot), and/or the terminal receives channel quality reporting trigger control information, and a base station (the first communication node) indicates that ACK/NACK response control information for the downlink data channel and/or channel state information feedback need to be sent on slotn4. When a sending beam of the uplink control channel is acquired according to a sending beam of a downlink control channel (or when the sending beam of the uplink control channel is acquired according to a receiving beam for receiving the downlink control channel, if the sending beam of the uplink control channel is acquired according to the sending beam of the downlink control channel, the sending beam of the uplink control channel is also referred to as acquired through the receiving beam for receiving the downlink control channel, and the base station configures for the terminal merely information about the sending beam of the downlink control channel, not information about the receiving beam of the downlink control channel), the sending beams on the {slotn1, slotn2, slotn3} are different from a sending beam of a downlink control channel related to a downlink data channel, and/or the transmission modes of the {slotn1, slotn2, slotn3} are different from a transmission mode of a downlink control channel triggering the channel quality feedback. For example, for sending beam 1 to sending beam 3 in FIG. 3, a receiving beam set used by the terminal for receiving a control channel using {sending beam 1 to sending beam 3} is sequentially {receiving beam 1 to receiving beam 3}, the terminal obtains a sending beam set {sending beam 1', sending beam 2', sending beam 3'} (i.e., the M=3 transmission mode sets, where for simplicity, merely one sending beam is included in each transmission mode set, and the present embodiment does not exclude that each transmission mode set among the M transmission mode sets includes more than one sending beam) for sending the uplink control channel according to uplink and downlink reciprocity and according to {receiving beam 1 to receiving beam 3} for receiving the downlink control channel, and the terminal needs to select a sending beam from these three sending beams for sending the uplink control channel.

The terminal selects, according to time information corresponding to the three sending beams, a sending beam for sending the uplink control channel, such as selecting a sending beam corresponding to the latest time, as shown in FIG. 3, the sending beam 1' corresponds to a time unit slotn1, the sending beam 2' corresponds to a time unit slotn2, and the sending beam 3' corresponds to a time unit slotn3, at this time, the sending beam 3' corresponding to the latest time slotn3 is selected for slotn4 according to the time information, and the uplink control channel is sent on slotn4 using the sending beam 3'.

At this time, a problem exists that the terminal misses detection of the PDCCH on slotn3, and thus the terminal sends the uplink control channel based on the sending beam 2', but if the sending beam 2' and the sending beam 3' correspond to different receiving beams of the base station in uplink transmission and if the base station uses a receiving beam 3 corresponding to the sending beam 3' to receive the uplink control channel on slotn4, a problem exists that the base station cannot receive the uplink control channel fed back by the terminal. One way is that the base station receives the uplink control channel on slotn4 using receiving beam 1 to receiving beam 3, which results in a waste of receiving resources of the base station. Another way is as follows: the base station firstly uses the receiving beam 3 on slotn4 to receive the uplink control channel sent by the terminal, if the uplink control channel is not received, it indicates that the current channel environment of the terminal is poor, and the base station configures, through control signaling, a sending beam used by the terminal for subsequently sending the PUCCH.

In FIG. 3, slotn1 to slotn3 have a chronological order, and may be continuous in the time domain or discrete in the time domain. Slotn4 may be the same slot as slotn3 or may be a slot after slotn3, and of course FIG. 3 is merely an example and another time unit like slot may be used, such as a mini-slot, a sub-frame, etc.

Figure 4:
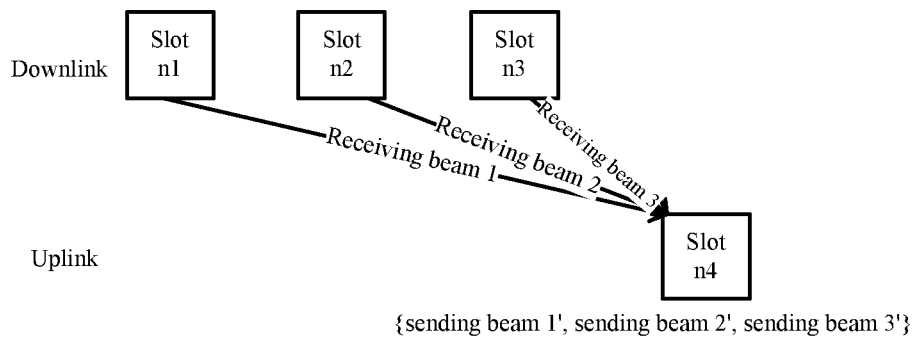
FIG. 4 is an exemplary diagram of acquiring M transmission mode sets through receiving modes of a downlink control channel according to an application example of the present disclosure.

In FIG. 3, the transmission mode of the uplink control channel is obtained according to the transmission mode of the downlink control channel, that is, the transmission mode pattern of the downlink control channel is notified by control signaling, and the terminal receives the downlink control channel using a suitable receiving beam based on the notified transmission mode and then obtains, according to the uplink and downlink reciprocity, the transmission mode of the uplink control channel according to the receiving mode. In another implementation mode of the present embodiment, as shown in FIG. 4, the base station notifies, through the control signaling, the terminal of the receiving mode pattern for receiving or detecting the downlink control channel, and the terminal obtains M transmission mode sets according to uplink and downlink reciprocity based on the notified receiving beam pattern and then selects N transmission modes from the M transmission mode sets to send the uplink control channel. In the implementation mode described above, the M transmission mode sets are obtained from the transmission mode of the downlink control channel (or from the receiving beam for receiving the downlink control channel). In another implementation mode of the present embodiment, M downlink control channels may also notify the terminal of information about the transmission mode used by the terminal to send the uplink control channel, for example, in the DCI notifying the PDSCH or in the DCI triggering the CSI reporting in {slotn1 to slotn3} in FIG. 3, the base station notifies the terminal of the transmission mode configured for sending the uplink control information, and thus three transmission modes exist, i.e., the M transmission mode sets.

Application Example 2

In the present application example, a terminal (i.e., the first communication node) selects N sending beams from M sending beam sets (i.e., transmission mode sets) for sending an uplink control channel. M is a natural number, and N is a natural number less than or equal to M. The terminal selects the N transmission mode sets according to time information corresponding to the M transmission modes and the types of signals related to the transmission modes.

As shown in FIG. 3, the terminal receives a downlink data channel signal and/or a downlink measurement reference signal on {slotn1,slotn2,slotn3} and the base station (i.e., the second communication node) indicates ACK/NACK response control information for a downlink data channel and/or channel state information feedback need to be sent on slotn4. When a sending beam of the uplink control channel is acquired according to a sending beam of a downlink control channel (or when the sending beam of the uplink control channel is acquired according to a receiving beam for receiving the downlink control channel), transmission modes on the {slotn1, slotn2, slotn3} are different from a transmission mode of a downlink control channel related to the downlink data channel. For example, for sending beam 1 to sending beam 3 in FIG. 3, a receiving beam set {receiving beam 1 to receiving beam 3} for receiving {sending beam 1 to sending beam 3} is correspondingly obtained, the terminal obtains, according to uplink and downlink reciprocity and according to {receiving beam 1 to receiving beam 3} for receiving the downlink control channel, {sending beam 1', sending beam 2', sending beam 3'} (i.e. the M=3 transmission mode sets) for sending the uplink control channel, and the terminal needs to select a sending beam from the three sending beams for sending the uplink control channel signal.

Figure 5:
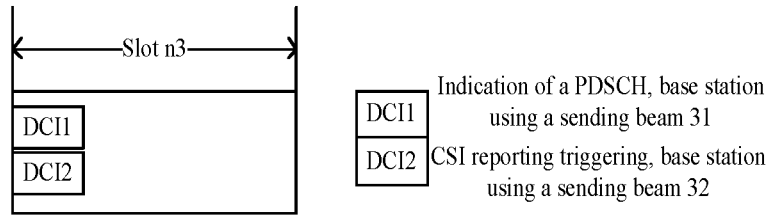
FIG. 5 is an exemplary diagram of notifying existence of two pieces of Downlink Control Information (DCI) in one time unit according to an application example of the present disclosure.

In the present application example, the N transmission mode sets are selected according to the time information corresponding to the M transmission modes and the types of signals related to the M transmission modes, as shown in FIG. 5, that is, when the terminal receives a downlink data channel (such as a PDSCH) on slotn3, a downlink measurement reference signal (preferably, the downlink measurement reference signal is a periodically triggered downlink measurement reference signal, or a downlink control channel triggering the downlink measurement reference signal also exists) is also received, and/or downlink control information triggering channel state information (CSI) reporting also exists. As shown in FIG. 5, DCI1 and DCI2 exist in slotn3, DCI1 is configured for notifying relevant information of the PDSCH, a sending beam of a base station corresponding to DCI1 is a beam 31, DCI2 is configured for activating CSI reporting, and a sending beam of the base station corresponding to DCI2 is a beam 32. Then, the terminal on slotn4 needs to select one of the sending beams {31', 32'} to send the uplink control channel. For example, the priority of the ACK/NACK is higher than the priority of the CSI, and then the uplink control channel is sent by using the sending beam 31', where the uplink sending beam 31' corresponds to the sending beam 31 of the base station, and the uplink sending beam 32' corresponds to the sending beam 32 of the base station, for example, according to uplink and downlink reciprocity, the terminal obtains the uplink sending beam 32' according to the receiving beam configured for receiving the sending beam 32 sent by the base station. The priority of the ACK/NACK may, of course, also be lower than the priority of the CSI, and then the terminal sends the uplink control channel by using 32'.

Figure 6:
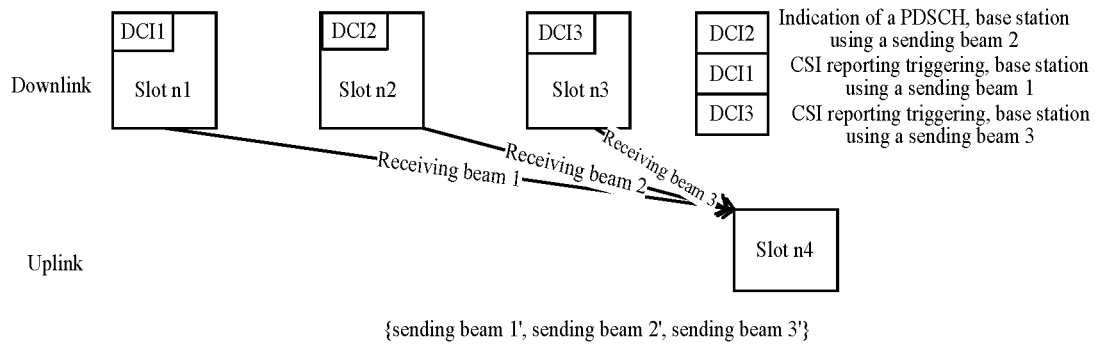
FIG. 6 is an exemplary diagram of selecting a transmission mode of an uplink control channel according to time information and associated signal types corresponding to M transmission mode sets according to an application example of the present disclosure.

Among the above manners, firstly, a transmission mode is selected according to the time information corresponding to the transmission mode, and then N transmission mode sets are selected from the M transmission mode sets according to the signal type of the second signal corresponding to the transmission mode. In another implementation mode of the present embodiment, the transmission mode is selected firstly according to the signal type of the second signal corresponding to the transmission mode, and when the signal types are the same, the transmission mode is selected according to the time information corresponding to the transmission mode. As shown in FIG. 6, although slotn3 is relatively late in time, PDSCH information is indicated in DCI2 in slotn2, DCI3 and DCI1 which trigger CSI reporting are indicated in slotn3 and slotn1, respectively, and since the priority of the feedback ACK/NACK is higher than the priority of CSI, the uplink control channel is sent by using a sending beam 2'. In the above implementation mode, the terminal sends the uplink control channel by selecting N transmission mode sets according to the time information corresponding to the M transmission mode sets and the signal types of the second signals corresponding to the M transmission mode sets. Another implementation mode of the present embodiment is that the terminal sends the uplink control channel by selecting N transmission mode sets according to time information corresponding to the M transmission mode sets and control information types (such as types of uplink control information) corresponding to the M transmission mode sets. The types of uplink control information include ACK/NACK uplink control information and channel quality feedback information, and of course other types of uplink control channel are not excluded.

Application Example 3

In the present application example, a terminal (i.e., the first communication node) selects N sending beams from M sending beam sets (i.e., transmission mode sets) for sending an uplink control channel. M is a natural number, and N is a natural number less than or equal to M. In the present application example, the terminal selects the M sending beam sets as the N sending beam sets.

As shown in FIG. 3, the terminal receives a downlink data channel signal and/or a downlink measurement reference signal on {slotn1,slotn2,slotn3} and a base station (i.e., the second communication node) indicates ACK/NACK response control information for a downlink data channel and/or channel state information feedback need to be sent on slotn4. When a sending beam of the uplink control channel is acquired according to a sending beam of a downlink control channel (or when the sending beam of the uplink control channel is acquired according to a receiving beam for receiving the downlink control channel), transmission modes on the {slotn1, slotn2, slotn3} are different from a transmission mode of a downlink control channel related to the downlink data channel. For example, for sending beam 1 to sending beam 3 in FIG. 3, a receiving beam set {receiving beam 1 to receiving beam 3} for receiving {sending beam 1 to sending beam 3} is correspondingly obtained, the terminal obtains, according to uplink and downlink reciprocity and according to {receiving beam 1 to receiving beam 3} for receiving the downlink control channel, {sending beam 1', sending beam 2', sending beam 3'} (i.e. the M=3 transmission mode sets) for sending the uplink control channel, and the terminal needs to select a sending beam from the three sending beams for sending an uplink control channel signal.

In the present application example, the M transmission mode sets are configured for sending the uplink control channel, that is, the N transmission mode sets are the M transmission mode sets. At this time, a way is that uplink control information (UCI) sent on different sending beams is different (for example, in FIG. 3, when the terminal sends the uplink control channel by using the {sending beam 1', sending beam 2', sending beam 3'}, feedback information for downlink slotn1 is sent on the sending beam 1', feedback information for downlink slotn2 is sent on the sending beam 2', and feedback information for downlink slotn3 is sent on the sending beam 3'). Another way is that uplink control information sent on different transmission modes is the same (for example, in FIG. 3, when the terminal sends the uplink control channel by using the {sending beam 1', sending beam 2', sending beam 3'}, feedback information for downlink slotn1 to slotn3 needs to be sent on each of {sending beam 1', sending beam 2', sending beam 3'}, where the feedback information includes ACK/NACK and/or CSI information, and of course other feedback information is not excluded).

The {sending beam 1', sending beam 2', sending beam 3'} may be sent in at least one of the following multiplexing manners: time division multiplexing, frequency division multiplexing, different sending beams occupying different demodulation reference signal port groups, or different sending beams occupying different sending antenna port groups.

Application Example 4

In the present application example, a terminal (i.e., the first communication node) selects N sending beams from M sending beam sets (i.e., transmission mode sets) for sending an uplink control channel. M is a natural number, and N is a natural number less than or equal to M. In the present application example, the terminal selects N transmission modes from M transmission mode sets according to indication information about control signaling information.

As shown in FIG. 3, the terminal receives a downlink data channel signal and/or a downlink measurement reference signal on {slotn1,slotn2,slotn3} and the base station (i.e., the second communication node) indicates ACK/NACK response control information for a downlink data channel and/or channel state information feedback need to be sent on slotn4. When a sending beam of the uplink control channel is acquired according to a sending beam of a downlink control channel (or when the sending beam of the uplink control channel is acquired according to a receiving beam for receiving the downlink control channel), transmission modes on the {slotn1, slotn2, slotn3} are different from a transmission mode of a downlink control channel related to the downlink data channel. For example, for sending beam 1 to sending beam 3 in FIG. 3, a receiving beam set {receiving beam 1 to receiving beam 3} for receiving {sending beam 1 to sending beam 3} is correspondingly obtained, the terminal obtains, according to uplink and downlink reciprocity and according to {receiving beam 1 to receiving beam 3} for receiving the downlink control channel, {sending beam 1', sending beam 2', sending beam 3'} (i.e. the M=3 transmission mode sets) for sending the uplink control channel, and the terminal needs to select a sending beam from the three sending beams for sending the uplink control channel signal.

In the present application example, the terminal selects the N transmission modes from the M transmission mode sets according to the indication information about the control signaling information, and as shown in FIG. 3, in slotn4 or slotn3, the base station indicates, through the indication information, the N transmission modes selected by the terminal from the M transmission mode sets. The selection of the sending beam 2' in the {sending beam 1' to sending beam 3'} to send the uplink control information is indicated in slotn4 or slotn3.

Alternatively, as shown in FIG. 3, in slotn1 or in a time unit before slotn1, the control information indicates selection principle information for the terminal to select the N transmission mode sets from the M transmission mode sets.

Application Example 5

In the present application example, a terminal (i.e., the first communication node) selects N sending beams from M sending beam sets (i.e., transmission mode sets) for sending an uplink control channel. M is a natural number, and N is a natural number less than or equal to M.

As shown in FIG. 3, the terminal receives a downlink data channel signal and/or a downlink measurement reference signal on {slotn1,slotn2,slotn3} and the base station (i.e., the second communication node) indicates ACK/NACK response control information for a downlink data channel and/or channel state information feedback need to be sent on slotn4. When a sending beam of the uplink control channel is acquired according to a sending beam of a downlink control channel (or when the sending beam of the uplink control channel is acquired according to a receiving beam for receiving the downlink control channel), transmission modes on the {slotn1, slotn2, slotn3} are different from a transmission mode of a downlink control channel related to the downlink data channel. For example, for sending beam 1 to sending beam 3 in FIG. 3, a receiving beam set {receiving beam 1 to receiving beam 3} for receiving {sending beam 1 to sending beam 3} is correspondingly obtained, the terminal obtains, according to uplink and downlink reciprocity and according to {receiving beam 1 to receiving beam 3} for receiving the downlink control channel, {sending beam 1', sending beam 2', sending beam 3'} (i.e. the M=3 transmission mode sets) for sending the uplink control channel, and the terminal needs to select a sending beam from the three sending beams for sending the uplink control channel signal.

Figure 7:
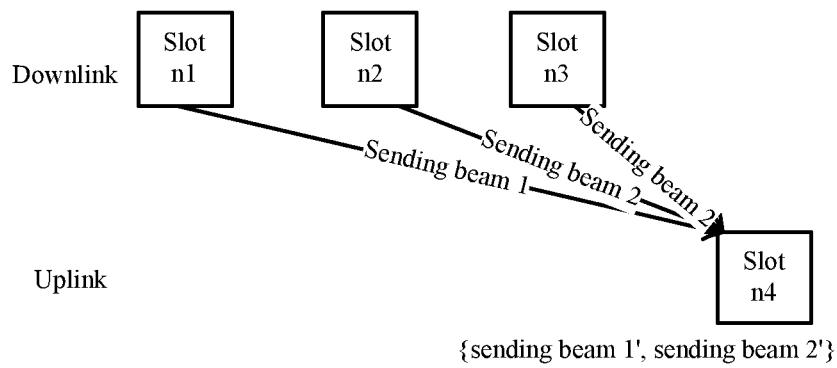
FIG. 7 is an exemplary diagram of selecting a transmission mode of an uplink control channel according to time density information corresponding to M transmission mode sets according to an application example of the present disclosure.

In the present application example, the N sending beams are selected from the M transmission mode sets according to priorities of the transmission mode sets, such as selecting sending beams having high priorities from the M transmission mode sets, where the priorities of the sending beams may be indicated by the base station or according to whether the sending beams are primary serving beams, or the higher the time domain density of a send beam is, the higher the priority is. For example, in FIG. 7, the sending beam 1 related to the sending beam 1' occurs a higher number of times than the sending beam 2 related to the sending beam 2', and the sending beam 1' is selected to send the uplink control channel in slotn4.

The N transmission modes may also be selected in a manner of at least one combination of the selection manners in application example 1 to application example 5 described above.

In FIG. 3, slotn1 to slotn3 have a chronological order, and may be continuous in the time domain or discrete in the time domain. Slotn4 may be the same slot as slotn3 or may be a slot after slotn3, and of course FIG. 3 is merely an example and another time unit like slot may be used, such as a mini-slot, a sub-frame, etc.

In FIG. 3, the transmission mode of the uplink control channel is obtained according to the transmission mode of the downlink control channel, that is, the transmission mode pattern of the downlink control channel is notified by control signaling, and the terminal receives the downlink control channel using a suitable receiving beam based on the notified transmission mode and then obtains, according to the uplink and downlink reciprocity, the transmission mode of the uplink control channel according to the receiving mode. In another implementation mode of the present embodiment, as shown in FIG. 4, the base station notifies, through the control signaling, the terminal of the receiving mode pattern for receiving or detecting the downlink control channel, and the terminal obtains M transmission mode sets according to uplink and downlink reciprocity based on the notified receiving beam pattern.

The M transmission mode sets are obtained through the transmission mode of the downlink control channel (or a receiving mode for receiving the downlink control channel), and in another implementation mode, may also be obtained through M pieces of downlink control information. For example, in the DCI notifying a PDSCH or the DCI triggering CSI reporting in {slotn1-slotn3} in FIG. 3, the base station notifies the terminal of the sending beams configured for sending the control information, so that three transmit beams also exist, i.e., the M sending beams.

Application Example 6

In the present application example, a transmission mode of an uplink control channel is obtained according to a transmission mode of a downlink control channel.

Figure 8:
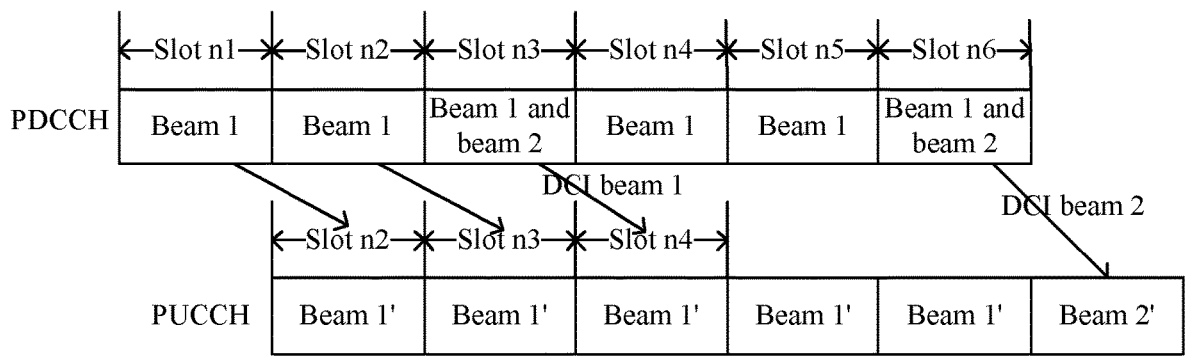
FIG. 8 is an exemplary diagram of obtaining a transmission mode of an uplink control channel according to a detected transmission mode (or receiving mode) of a downlink control channel according to an application example of the present disclosure.

In the present application example, no matter how to set a multi-beam (the beam is the transmission mode) pattern of the downlink control channel, a sending beam of the uplink control channel is determined according to a detected sending beam of a PDCCH. As shown in FIG. 8, a base station configures the sending beam pattern of the downlink control channel to be {sending beam 1, sending beam 1, sending beam 1 and sending beam 2} through control signaling, the terminal obtains that a downlink sending beam 1 corresponds to an uplink sending beam 1' and that a downlink sending beam 2 corresponds to an uplink sending beam 2' according to uplink and downlink reciprocity or another association relationship, and in FIG. 8, the terminal obtains a transmission mode of an uplink control channel according to a detected receiving beam corresponding to the downlink control channel. For example, in slotn3, a base station may be configured to use a sending beam 1 and a sending beam 2 to send the downlink control channel, a control channel corresponding to the sending beam 1 and the sending beam 2 is sent in a time division manner or a frequency division manner, or the sending beam 1 and the sending beam 2 correspond to different receiving beams, and the terminal obtains the sending beam of the uplink control channel according to the actually detected sending beam of the downlink control channel. For example, the base station may be configured, through higher-layer control signaling (or preceding control signaling), to send the downlink control channels on {sending beam 1 and sending beam 2} on {slotn3,slotn6}, and the terminal sends the uplink control channels according to the actually detected beams of the downlink control channels, for example, on slotn3, the downlink control channel is detected on the sending beam 1 and is not detected on the sending beam 2, and then the uplink control channel is sent by using an uplink sending beam 1' corresponding to the sending beam 1. On slotn6, a downlink control channel is detected on the sending beam 2 and is not detected on the sending beam 1, and then the uplink control channel is sent by using an uplink sending beam 2' corresponding to the sending beam 2. The detected downlink control channel must be a downlink control channel related to the uplink control channel, such as a downlink control channel for allocating downlink data, and the uplink control channel includes ACK/NACK feedback information of the downlink data. The downlink control channel may also not be limited, for example, the downlink control channel may be any downlink control channel sent to the terminal and is not necessarily associated with the uplink control channel, for example, the uplink control channel is a periodic CSI (or semi-periodic) uplink control channel, while the downlink control channel is a downlink control channel for allocating downlink data resources and/or a downlink control channel for allocating uplink data resources.

Alternatively, it is agreed that the base station certainly needs to send the downlink control channel to the terminal by using the sending beam 1 and the sending beam 2 on {slotn3, slotn6}, and the terminal selects an optimal sending beam to send the uplink control channel to the base station according to the receiving quality of the two sending beams. Of course, it is also possible that the sending beam 1' and the sending beam 2' of the terminal correspond to different uplink control channel resources, the terminal selects the sending beam having the best receiving quality and selects the uplink control channel resource corresponding to the sending beam to send the uplink control channel, and the base station knows the sending beam selected by the terminal according to the detected uplink control channel resource. The uplink control channel resource includes at least one of: a time domain resource, a code domain resource, a frequency domain resource, or a demodulation reference signal port resource.

Of course, different sending beams may correspond to different control channel search spaces, where the search space may also be named as a control channel resource set or others.

Application Example 7

In the present application example, a transmission mode of an uplink control channel is obtained according to a transmission mode of a downlink control channel.

In the present application example, the terminal obtains the sending beam of the uplink control channel merely according to the configured multi-beam pattern of the downlink control channel and not according to the actually detected receiving beam of the PDCCH (i.e., DCI in the figure), and the terminal obtains the sending beam of the uplink control channel merely according to configuration information about a sending beam (or configuration information about a receiving beam) of the downlink control channel in a time unit associated with the uplink control channel. In an implementation mode about the time unit associated with the uplink control channel, the time unit includes a downlink signal or downlink control signaling, and uplink feedback information corresponding to the downlink signal or the downlink control signaling is included in the uplink control channel. The time unit associated with the uplink control channel is the time unit where the uplink control channel is located.

Figure 9:
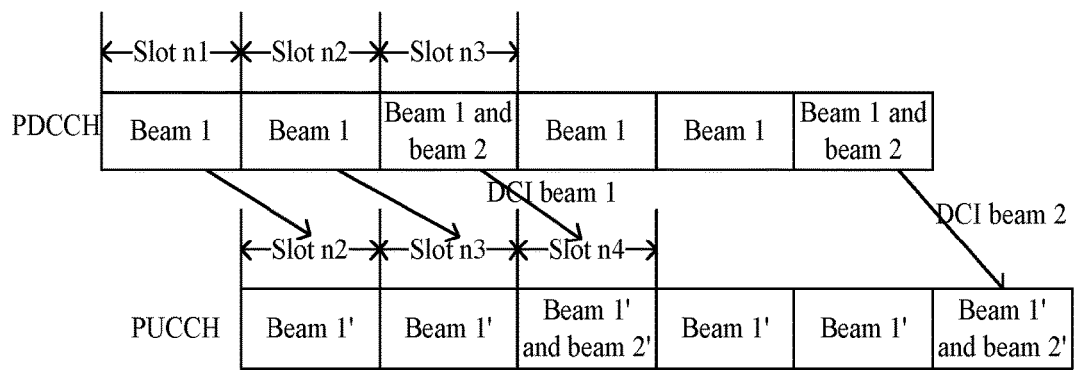
FIG. 9 is an exemplary diagram of acquiring a transmission mode of an uplink control channel according to a transmission mode of a downlink control channel related to the uplink control channel according to an application example of the present disclosure.

Specifically, as shown in FIG. 9, before slotn3, the base station configures the sending beams of the downlink control channel to be {sending beam 1, sending beam 2} on slotn3 through signaling information, so that the terminal needs to detect the downlink control channel on the receiving beam 1 and the receiving beam 2 on slotn3, but in the implementation mode of acquiring the sending beam of the uplink control channel according to the configuration information about the downlink control channel, regardless of the detection of the downlink control information (e.g., information about whether the downlink control channel is detected by the terminal on slotn3 or about which receiving beam on which the downlink control information is detected), the terminal obtains information about the sending beam of the uplink control channel merely according to the configuration information, previously configured on slotn3, about the beams {sending beam 1, sending beam 2} for the base station to send the downlink control channel. The downlink data channel or the downlink measurement reference signal is included on slotn3, or triggering signaling for triggering the terminal to report the channel quality is included on slotn3, where the ACK/NACK feedback information about the data channel and/or the channel quality feedback information of the measurement reference signal and/or the channel quality feedback information of the measurement reporting trigger signaling are on slotn3. Uplink feedback information corresponding to slotn3 is fed back on slotn4, and the terminal sends the uplink control channel by using {sending beam 1', sending beam 2'}, regardless of an actually detected transmission mode in which the base station sends the downlink control channel. As shown in FIG. 9, the terminal detects the downlink control channel sent by the base station in the transmission mode 1 from the receiving mode 1', and does not detect the downlink control channel sent by the base station in the transmission mode 2 from the receiving mode 2'.

When the time unit associated with the uplink control channel is the time unit where the uplink control channel is located, as shown in FIG. 9, the time unit is slotn4, and the terminal obtains information about the sending beam of the uplink control channel in slotn4 according to configuration information about the sending beam (or configuration information about the receiving beam) of the downlink control channel in slotn4.

When the time unit associated with the uplink control channel is the time unit where a downlink signal associated with the uplink control channel is located, as shown in FIG. 9, the time unit associated with the uplink control channel sent on slotn4 is slotn3, and the terminal obtains information about the sending beam of the uplink control channel in slotn4 according to configuration information about the sending beam (or configuration information about the receiving beam) of the downlink control channel in slotn3.

When the time unit associated with the uplink control channel is an agreed time window, as shown in FIG. 9, if the predetermined time window corresponding to slot k is {slotk−1,slot k,slotk+1}, and when {slotn1~slotn4} in FIG. 9 is continuous, the time unit window associated with the uplink control channel sent on slotn3 is {slotn2,slotn3,slotn4}, and the terminal obtains information about the sending beam of the uplink control channel in slotn3 according to configuration information about the sending beam (or configuration information about the receiving beam) of the downlink control channel in {slotn2,slotn3,slotn4}. Of course, the time window corresponding to slot k in the present embodiment is {slotk−1,slot k,slotk+1} by way of example only, and the case of other time windows is not excluded. For example, the time window is a downlink control channel sending beam pattern period, where the downlink channel pattern period is repeated. As shown in FIG. 8 or 9, the downlink control channel is repeated in a sending pattern of {sending beam 1, sending beam 1, sending beam 1 and sending beam 2}, that is, the sending beam pattern of the downlink control channel is repeated every three time units, and the figure shows the sending beams (or a receiving beam pattern configured by the base station and required by the terminal to receive the downlink control channel) configured by the base station and used by the base station to send the downlink control channel, but the base station does not necessarily send the downlink control channel to the terminal in one time unit, that is, the downlink control channel is sent on demand.

Application Example 8

In the present application example, a transmission mode of an uplink control channel is obtained according to a transmission mode of a downlink control channel.

In the present application example, the uplink control channel is firstly sent by using the sending beam of a terminal corresponding to a main beam of the downlink control channel, and whether the uplink control channel is sent on an auxiliary beam is further determined according to indication information. For example, the configuration of sending beam patterns of the downlink control channel is as shown in FIGS. 8 and 9 and a main beam is configured to be a sending beam 1, and the terminal firstly sends the uplink control channel on a sending beam 1' of the terminal corresponding to the sending beam 1 of a base station, and when indication information from the base station and indicating that the uplink control channel needs to be sent on the auxiliary beam (i.e., a sending beam 2' corresponding to a sending beam 2 of the base station), the uplink control channel is sent by using the auxiliary beam. Alternatively, when the base station indicates that the uplink control channel needs to be sent on the auxiliary beam, the uplink control channel is sent by using the main beam 1' and the auxiliary beam 2'. For example, in FIGS. 8 and 9, the terminal sends on slotn2 and slotn3 the uplink control channels by using the main beams 1', respectively, and the base station indicates on slotn3 or slotn4 through indication information the receiving situation of the uplink control channel fed back on {slotn2~slotn3} by the terminal to the base station. If the indication information indicates that the base station has received the uplink control channel fed back by the terminal to the base station, the terminal sends merely uplink control information for slotn3 on the sending beam 2' of slotn4. If the indication information indicates that one or all of the uplink control channels fed back by the terminal on {slotn2~slotn3} are not received by the base station (e.g., the base station indicates the receiving situation of the uplink control channels fed back on {slotn2~slotn3} by the terminal to the base station by means of the indication information of a bitmap), the terminal needs to send on the auxiliary beam 2' of slotn4 not only feedback information for downlink slotn3, but also the part of the uplink control channels sent on the {slotn2~slotn3} which are not received by the base station, and thus a case may exist where on slotn4, the content sent on the main beam 1' is different from the content sent on the auxiliary beam 2', for example, merely feedback information for downlink slotn3 is sent on the main beam 1', and not only the feedback information for slotn3 but also the feedback information for {slotn1~slotn2} which was not successfully received by the base station before needs to be sent on the auxiliary beam 2'.

Figure 10:
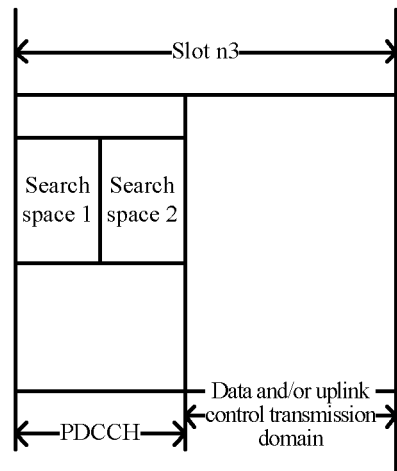
FIG. 10 is an exemplary diagram illustrating that two search spaces in one time unit corresponds to two different transmission modes of a downlink control channel according to an application example of the present disclosure.

In the implementation mode described above, whether the uplink control channel is sent on the auxiliary beam (or whether multiple beams are used) is determined according to the indication information sent by the base station. In the second implementation mode of determining whether to send the uplink control channel on the auxiliary beam (or whether to use multiple beams), whether the uplink control channel is sent on the auxiliary beam (or whether the uplink control channel is sent by using multiple beams) is determined according to whether the sending beam of the base station is detected at the time of detecting the auxiliary beam by the terminal. For example, in FIG. 8, the downlink control channel may be configured to be sent by the base station using the sending beam 1 and/or the sending beam 2 on slotn3, particularly, the search spaces of the sending beam 1 and the sending beam 2 are separated, and as shown in FIG. 10, on slotn3, the search space 1 corresponds to the sending beam 1 of the base station and the search space 2 corresponds to the sending beam 2 of the base station. Meanwhile, the sending beam 1 of the base station corresponds to the sending beam 1' of the terminal and the sending beam 2 of the base station corresponds to the sending beam 2' of the terminal. If the terminal detects the PDCCH in the search space corresponding to the sending beam 2 on slotn3 and the PDCCH indicates the PDSCH or triggers channel state information (CSI) reporting, the terminal needs to send on slotn4 the response ACK/NACK to the PDSCH and/or the CSI reporting by using the sending beam 2'. Of course, on slotn3, if the terminal detects a PDCCH in the search space corresponding to the sending beam 2 and detects a PDCCH in the search space corresponding to sending beam 1, and the two PDCCHs are repeated transmissions of the same DCI (or sending of different channel coding redundancy versions of the same DCI), the terminal sends the uplink control channel on slotn4 by using the sending beam 1' and the sending beam 2', where the uplink control channel includes response information about a PDSCH indicated by the downlink control channel and/or CSI reporting information triggered by the downlink control channel. In FIG. 10, the search space corresponding to the sending beam 1 and the search space corresponding to the sending beam 2 are time division, the present example does not exclude that the search spaces are frequency division, or the search space corresponding to the sending beam 1 is the same as the search space corresponding to the sending beam 2, and the terminal obtains the sending beam configured for the base station to send the downlink control channel according to the detection situation of the detected control channel.

In the implementation mode described above, whether the uplink control channel is sent on the auxiliary beam (or whether multiple beams are used) is determined according to the indication information sent by the base station. In the third implementation mode of determining whether to send the uplink control channel on the auxiliary beam (or whether to use multiple beams), the terminal uses the auxiliary beam to send the uplink control channel when the PDSCH is retransmitted.

Application Example 9

In the present application example, a transmission mode of an uplink control channel is obtained according to a transmission mode of a downlink control channel. Or among control information sent by a base station, the transmission mode (or receiving mode) of the downlink control channel and the transmission mode of the uplink control channel share configuration information.

Figure 11:
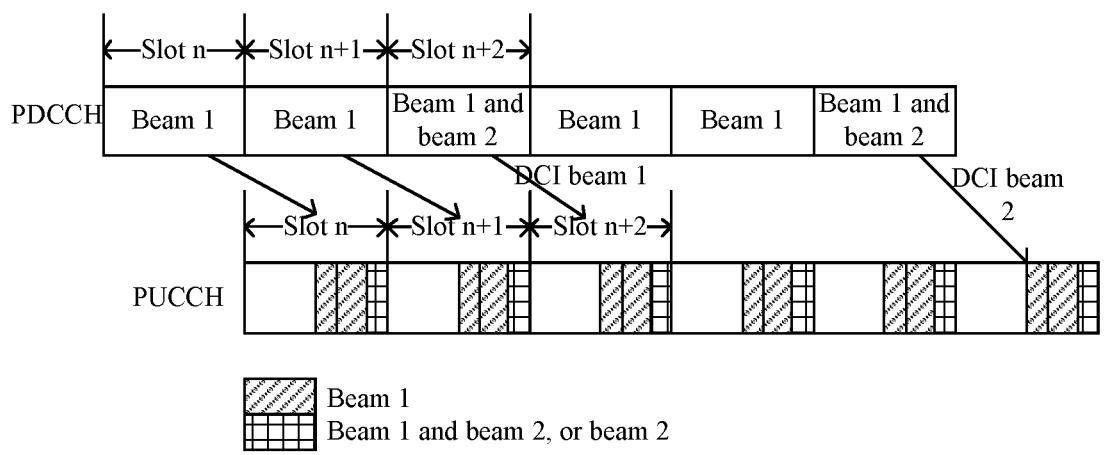
FIG. 11 illustrates that a transmission mode of each uplink control channel is the same, and that ratio occupation of the transmission mode of an uplink control channel is the same as ratio configuration of a transmission mode (or receiving mode) of a downlink control channel according to an application example of the present disclosure.

In the present application example, the resource granularities of the transmission modes of the uplink control channel and the downlink control channel are different but the proportions are the same, the situations of beams used by the uplink control channels sent at different time are the same, and each PUCCH is a downscaled version of the whole PDCCH mode. As shown in FIG. 11, when the sending pattern of the sending beam (or the receiving beam) of the downlink control channel is configured to be in a manner, i.e., a pattern of repeating {sending beam 1, sending beam 1, sending beam 1 and/or sending beam 2}, shown in FIG. 12, the sending beams used by each uplink control channel are {sending beam 1', sending beam 1', sending beam 1' and/or sending beam 2'}. That is, the time granularity of different transmission mode sets (or different receiving mode sets) in the downlink control channel in the shared configuration information is a slot, while the time granularity of different transmission modes in the uplink control channel in the shared configuration information is an Orthogonal Frequency Division Multiplexing (OFDM) symbol (of course multiple OFDM symbols are also possible).

Figure 12:
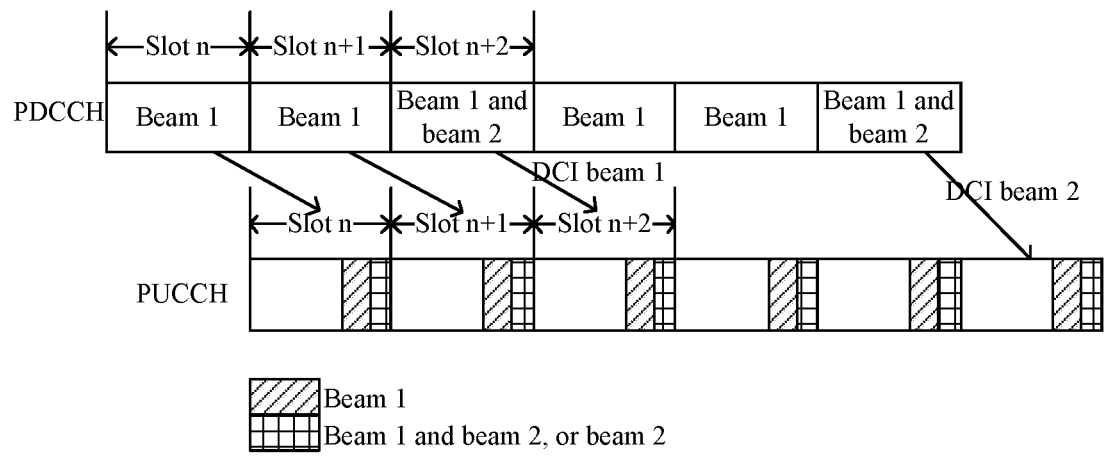
FIG. 12 illustrates that a transmission mode of each uplink control channel is the same, and that resources are occupied in equal proportion by transmission modes of uplink control channels according to an application example of the present disclosure.

Of course, the pattern of the sending beams in the uplink control channel may also be based merely on the number of sending beams of the downlink control channel, without strictly referring to the pattern of the sending beams in the downlink control channel, for example, in FIG. 12, the sending beam 1' and the sending beam 2' in an uplink control channel occupy the resources of the uplink control channel in equal proportion. That is, the different transmission mode sets of the uplink control channel and the different transmission modes of the downlink control channel occupy different time resource granularities and proportions.

When the terminal needs to use multiple beams to send the uplink control channel, for example, when the terminal needs to use the sending beam 1' and the sending beam 2' to send the uplink control channel, the multiple beams may be sent in a time division manner and/or in a frequency division manner, and of course the multiple beams may be sent in a manner of occupying the same time-frequency resource and occupying different sending antennas, or the multiple beams may be sent in a manner of occupying the same time-frequency resource and that in a manner that different sending beams occupy different demodulation reference signals. Alternatively, the uplink control channel is sent by using two sending beams on one demodulation reference signal through the same time-frequency resource.

Figure 13:
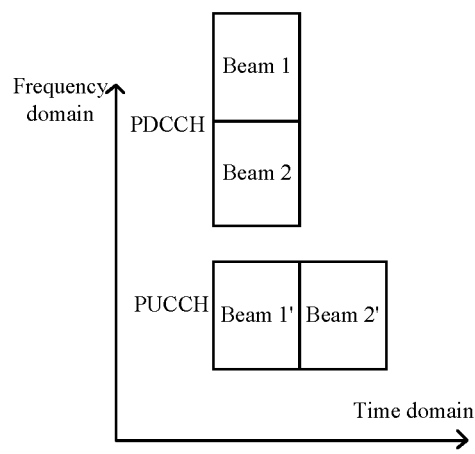
FIG. 13 is an exemplary diagram of a frequency division transmission mode of a downlink control channel corresponding to a time division transmission mode of an uplink control channel according to an application example of the present disclosure.

Of course, multiplexing manners of different transmission modes of the downlink control channel and multiplexing manners of different transmission modes of the uplink control channel may also be different. As shown in FIG. 13, two sending beams in the downlink control channel are sent in the frequency division manner, and through mapping, needs to be sent in the uplink control channel in the time division manner. For example, when the number of receiving radio frequency links of the terminal is greater than the number of sending radio frequency links of the terminal, two sending beams may be received simultaneously, while two sending beams cannot be sent simultaneously and need to be sent in the time division manner.

The above-mentioned sending beam 1 may be a sending beam set 1 and the sending beam 2 may be a sending beam set 2.

The above resources are time domain resources, and similarly the resources may also be frequency domain resources, and/or demodulation reference signal resources, and/or sending antenna port resources.

Application Example 10

Figure 14:
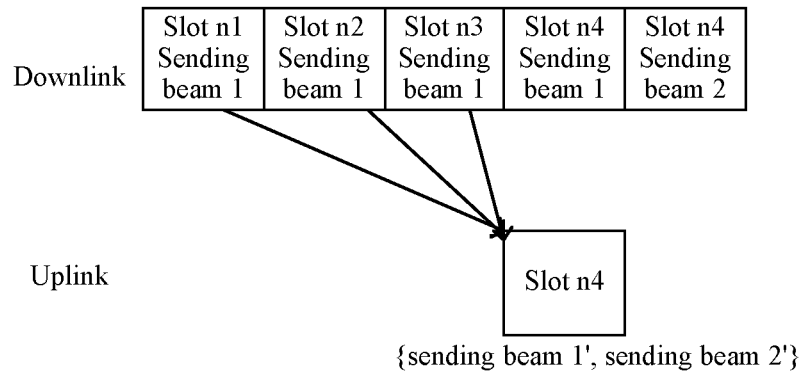
FIG. 14 is an exemplary diagram illustrating that M transmission mode sets are obtained according to configured transmission mode sets of a downlink control channel and are irrelevant to a downlink control channel associated with an uplink control channel according to an application example of the present disclosure.

In the present application example, a terminal performs selection from M sending beam sets (i.e., the M transmission mode sets), where the M transmission mode sets are formed by transmission mode sets of a downlink control channel configured by a base station. As shown in FIG. 14, a sending pattern of the downlink control channel configured by the base station is a pattern of repeating {sending beam 1, sending beam 1, sending beam 1, sending beam 1, sending beam 2}, and then the M sending beam sets are formed by {sending beam 1, sending beam 2} and are not associated with the downlink control channel associated with an uplink control channel. As shown in FIG. 14, the terminal feeds back ACK/NACK feedback information about {slotn1 to slotn3} on slotn4, but the sending beams of the uplink control channel on slotn4 is not obtained according to the sending beams (or configuration information about the receiving beams) of the downlink control channels of {slotn1 to slotn3} but according to the configuration information about the sending beams of the whole downlink control channel, the sending beams of the uplink control channel is obtained to be {sending beam 1, sending beam 2}, and the uplink sending beams are obtained to be {sending beam 1', sending beam 2'} according to uplink and downlink reciprocity. Further, the terminal may select one in {sending beam 1', sending beam 2'} to send according to the indication of the base station based on the obtained sending beams {sending beam 1', sending beam 2'}.

The terminal may select N transmission mode sets from the M transmission mode sets based on the indication of the base station or an agreed rule or a decision of whether a certain preset condition is satisfied, and the selected transmission mode sets are configured for sending the uplink control channel.

Application Example 11

In the present application example, information about a sending beam of an uplink control channel is configured through multi-layer control information.

For example, multiple uplink transmission mode sets are configured through higher-layer control signaling (including Radio Resource Control (RRC) control signaling and/or Media Access Control Element (MAC CE) control signaling), and then DCI signaling triggers a transmission mode set that is specifically used. As shown in Table 1, set 0 and set 1 are configured through the higher layer, and DCI signaling triggers one that is specifically used. The set 0 and the set 1 may also be configured in the manner of Table 2. When the high layer notifies the transmission mode set, not only information about the sending beam is notified, but also the multiplexing manner of the sending beam is notified, such as a time division multiplexing manner of the sending beam. Alternatively, as shown in Table 3, when the higher layer notifies the transmission mode set, the higher layer needs to notify the time domain resource where each sending beam set is located when multi-beam time division multiplexing is used. Of course, as shown in Table 4, when multi-beam time division multiplexing is used, a main beam is sent on the default time domain resource of the uplink control channel (the default time domain resource is the same as the time domain resource when the single beam is sent), and the time domain resource where the auxiliary beam is located is notified through higher-layer signaling.

TABLE 1

| DCI signaling | Transmission mode set |
| --- | --- |
| 0 | Set 0 {sending beam set 1'} |
| 1 | Set 1 {sending beam set 1' and sending beam set 2'} |

TABLE 2

| DCI signaling | Transmission mode set |
| --- | --- |
| 0 | Set 0 {sending beam set 1'} in a single time unit manner |
| 1 | Set 1 {sending beam set 1' and sending beam set 2'} in a multi-time unit manner |

TABLE 3

| DCI signaling | Transmission mode set |
| --- | --- |
| 0 | Set 0 {sending beam set 1'} in a single time unit manner |
| 1 | Set 1 {(sending beam set 1', time domain resource 1), (sending beam set 2', time domain resource 2)} in a multi-time unit manner |

TABLE 4

| DCI signaling | Transmission mode set |
| --- | --- |
| 0 | Set 0 {sending beam set 1'} in a single time unit manner |
| 1 | Set 1 {sending beam set 1', (sending beam set 2', time domain resource 2)} in a multi-time unit manner |

The time unit of the multi-beam time division multiplexing may be a slot or a time domain OFDM symbol or a time domain single carrier symbol or multiple time domain symbols in a slot. In the tables described above, multiple sending beams are sent through time division multiplexing, and the present embodiment does not, of course, exclude that multiple sending beams are sent by means of frequency division, or multiple demodulation reference signals, or multiple sending antennas, and similar to the above-mentioned notification of time domain resources, when a transmission mode set is notified through higher-layer control signaling, a frequency domain resource and/or a demodulation reference signal resource and/or a sending antenna port resource corresponding to each sending beam set are needed at the same time.

Application Example 12

In the present application example, a base station configures different transmission mode set information for different types of uplink control channels.

The different types include two or more of the following types: an uplink control channel for feeding back ACK/NACK, an uplink control channel for feeding back channel state information (further, different uplink control information may be divided into according to specific information about the fed back CSI, for example, different uplink control channels are divided into according to a feedback precoding matrix indicator (PMI), a rank indication (RI) and a channel quality indicator (CQI)), a periodically sent uplink control channel, an aperiodically sent uplink control channel, a uplink control channel of LTE, an uplink control channel of NR, a long-format uplink control channel or a short-format uplink control channel.

Specifically, since the uplink control channel of ACK/NACK and the uplink control channel for feeding back channel state information have different requirements on robustness and real-time performance, different transmission mode information may be configured for the two types of uplink control channels.

Alternatively, transmission mode information is configured for the uplink control channel of LTE and the uplink control channel of NR respectively.

Alternatively, since the long-format uplink control channel and the short-format uplink control channel have different requirements on real-time performance, transmission mode information is configured for the two types of uplink control channels respectively.

Alternatively, different transmission mode information is configured for the periodically sent uplink control channel and the aperiodically sent uplink control channel respectively.

Application Example 13

In the present application example, an acquisition mode for a transmission mode of an uplink control channel is acquired according to indication information.

For example, first indication information indicates whether the transmission mode of the uplink control channel can be acquired according to a transmission mode (or a receiving transmission mode) of the downlink control channel, and when the first indication information indicates the transmission mode of the uplink control channel can be acquired according to the transmission mode (or the receiving transmission mode) of the downlink control channel, the terminal acquires the transmission mode of the uplink control channel according to the configured transmission mode of the downlink control channel. When the first indication information indicates the transmission mode of the uplink control channel cannot be acquired according to the transmission mode (or the receiving transmission mode) of the downlink control channel, transmission mode related information of the uplink control channel further needs to be configured through second indication information. Particularly, when the second indication information performs indication through physical layer dynamic control information, when the first indication information indicates the transmission mode of the uplink control channel can be acquired according to the transmission mode (or the receiving transmission mode) of the downlink control channel, a domain indicating the transmission mode of the uplink control channel exists in the physical layer dynamic control information, and when the indication indicates the transmission mode of the uplink control channel cannot be acquired according to the transmission mode (or the receiving transmission mode) of the downlink control channel, the domain indicating the transmission mode of the uplink control channel does not exist in the physical layer dynamic control information, so that the number of bits in the physical layer dynamic control information is changed with the first indication information.

In the application example, when the first indication information indicates the transmission mode of the uplink control channel can be acquired according to the transmission mode (or the receiving transmission mode) of the downlink control channel, the terminal acquires the transmission mode of the uplink control channel according to the configured transmission mode of the downlink control channel, and the transmission mode of the downlink control channel and the transmission mode of the uplink control channel may also share the configuration information.

Application Example 14

In the present embodiment, a terminal determines an acquisition mode for a transmission mode, the terminal acquires the transmission mode according to the determined acquisition mode, and the terminal sends an uplink signal in the transmission mode.

The acquisition mode includes the following steps. The acquisition mode is determined according to a type of an uplink signal (i.e., a first signal), where the type of the uplink signal includes at least one of the following signals: a data channel signal, a control channel signal, a measurement reference signal, a demodulation reference signal, a resource request signal, a random access signal (such as a random access signal in a non-contention manner), or a beam recovery request signal and where types of the uplink signals are different and then the acquisition modes are different. And/or the terminal receives downlink control information, where the downlink control information indicates the acquisition mode. And/or the acquisition mode is determined according to indication information of whether uplink and downlink reciprocity is established. And when the uplink signal is an uplink control channel signal, the acquisition mode is determined according to a type of the first control channel signal.

The type of the uplink control channel includes at least one of the following types: the uplink control channel is periodically sent; the uplink control channel is aperiodically sent; the uplink control channel is semi-periodically sent; a time domain of the uplink control channel is less than a predetermined threshold; the time domain of the uplink control channel is greater than the predetermined threshold; the uplink control channel includes data channel response information; the uplink control channel includes channel state feedback information; the uplink control channel is a control channel over a first network; the uplink control channel is a control channel over a second network; duration of the uplink control channel is less than a predetermined threshold; the duration of the uplink control channel is greater than the predetermined threshold; the uplink control channel is a long-format control channel; or the uplink control channel is a short-format control channel.

Specifically, different transmission modes may be configured for different signals, or a transmission mode resource pool shared by each uplink signal may be notified through first downlink control information (such as higher-layer control information), and then a transmission mode of each uplink signal is specifically notified in second downlink control information, where the transmission mode notified in the second signal belongs to the transmission mode resource pool. A similar method may also be configured for different types of uplink control information.

Alternatively, acquisition modes of different types of signals are different, and the specific acquisition mode may be at least one of the following manners: obtaining the M transmission mode sets by acquiring transmission modes associated with multiple pieces of uplink control information included in the uplink signal; receiving downlink control information, and obtaining the M transmission mode sets according to the downlink control information; obtaining the M transmission mode sets according to configuration information about a to-be-detected search space of a control channel in a time unit associated with the uplink signal; obtaining the M transmission mode sets according to configuration information about a to-be-detected transmission mode of the control channel in the time unit associated with the uplink signal; obtaining the M transmission mode sets according to configuration information about a to-be-detected receiving mode of the control channel in the time unit associated with the uplink signal; obtaining the M transmission mode sets according to configuration information about a detected search space where the control channel is located in the time unit associated with the uplink signal; obtaining the M transmission mode sets according to configuration information about a detected transmission mode of the control channel in the time unit associated with the uplink signal; obtaining the M transmission mode sets according to configuration information about a detected receiving mode of the control channel in the time unit associated with the uplink signal; obtaining the M transmission mode sets by acquiring a transmission mode of a downlink signal associated with the uplink signal; obtaining the M transmission mode sets by acquiring a receiving mode of the downlink signal associated with the uplink signal; or acquiring information about the M transmission mode sets in an implicit manner. Of course, other acquisition modes are not excluded.

Of course, in the present application example, different acquisition modes may be notified at different time for the same signal type or the same control channel type.

Application Example 15

In the present application example, a base station notifies a terminal of a Sounding Reference Signal (SRS) port group when the base station configures an uplink signal, the receiving modes of sending beams corresponding to different ports in the SRS port group and arriving at corresponding base stations are the same, or the base station may simultaneously receive ports in use in the SRS port group when the terminal simultaneously sends the ports in use in the SRS port group.

Each SRS port corresponds to one CSI-RS resource, so that the terminal selects one (or more) SRS ports from the SRS port group according to the receiving situation of the corresponding CSI-RS resource, and sends the uplink signal by using a sending beam of the SRS port.

In the above implementation mode, an SRS port from an SRS port group is notified to the terminal when an uplink signal is configured, and at least one piece of the following information may also be configured to the terminal when the uplink signal is configured: an SRS resource group, a group of the SRS resource and PMI, or a sending beam group. Then, the terminal is enabled to select a sending beam (i.e., the transmission mode) corresponding to at least one piece of information in the group to send the uplink signal.

One SRS port corresponds to one CSI-RS resource, and at least one piece of the following information may also be provided: one SRS port corresponds to one CSI-RS port, or one SRS port corresponds to one CSI-RS resource and PMI.

In the above implementation mode, one SRS port group is configured for one uplink signal, and the terminal selects N SRS ports from M SRS ports in the SRS port group according to the receiving situation of CSI-RS resources corresponding to the SRS port group and sends the uplink signal by using sending beams for sending the N SRS ports. For example, the uplink signal is an uplink control channel. The present embodiment also does not exclude that the uplink signal is an uplink data channel.

Figure 15:
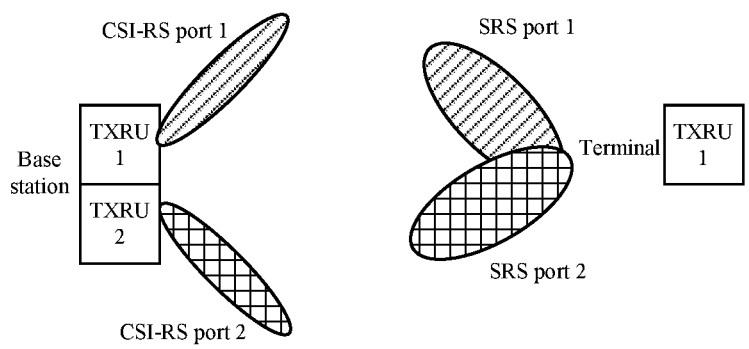
FIG. 15 is an exemplary diagram of correspondence between channel state information-reference signal (CSI-RS) ports of a base station and sounding reference signal (SRS) ports of a terminal according to an application example of the present disclosure.
Figure 16:
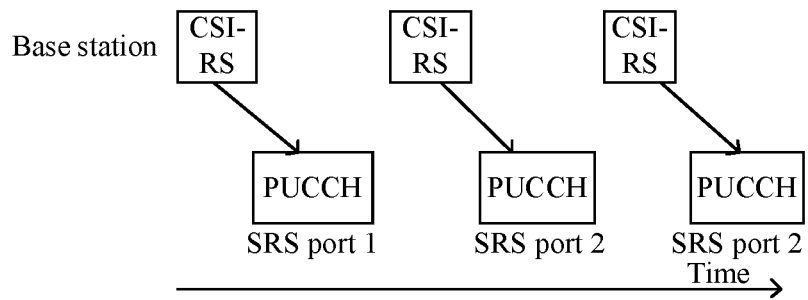
FIG. 16 is an exemplary diagram illustrating selection of an SRS port from an SRS port group by a terminal according to an application example of the present disclosure.

As shown in FIGS. 15 and 16, CSI-RS port 1 corresponds to SRS port 1, CSI-RS port 2 corresponds to SRS port 2, a base station configures an uplink control channel (SRS port 1 and SRS port 2), and merely one sending beam corresponding to radio frequency link SRS port 1 and SRS port 2 of the terminal can be generated in a time division manner. The terminal selects one of the SRS port 1 and the SRS port 2 to send the uplink control channel based on the receiving quality of the CSI-RS port 1 and the CSI-RS port 2.

Application Example 16

In the present application example, a base station notifies a downlink reference signal port group to a terminal when the base station configures an uplink signal, so that the terminal selects one or more downlink reference signals in the downlink reference signal port group according to the receiving quality, and obtains a sending beam of an uplink reference signal according to a receiving mode of the selected downlink reference signal.

Application Example 17

In the present application example, a transmission mode of an uplink data channel is determined according to a transmission mode of a downlink data channel or a receiving mode of the downlink data channel. The uplink data channel is sent according to the determined transmission mode. Specifically, for example, a sending beam (i.e., the transmission mode) configured for the uplink data channel is notified in higher-layer control information, and when the transmission mode of the downlink data channel (or the receiving mode of the downlink data channel) is notified in DCI, a terminal may obtain an uplink sending beam according to the uplink and downlink reciprocity. Alternatively, the terminal may obtain the uplink sending beam according to the transmission mode of the downlink data channel (or the receiving mode of the downlink data channel) and the uplink and downlink reciprocity only when the distance between the time unit where the DCI of the downlink data channel is located and the time unit of the uplink data channel is within a predetermined threshold. When the distance between the time unit where the DCI of the downlink data channel is located and the time unit of the uplink data channel is beyond the predetermined threshold, the sending beam of the uplink data channel is still notified through a higher layer.

Application Example 18

In the present embodiment, a transmission mode of an uplink data channel is determined according to a transmission mode of a downlink control channel or a receiving mode of the downlink control channel. The uplink data channel is sent according to the determined transmission mode.

Specifically, for example, a sending beam (i.e., the transmission mode) configured for the uplink data channel is notified in higher-layer control information, and the terminal is in accordance with the detected DCI, where the DCI includes resource allocation information about the uplink data channel. The terminal obtains an uplink sending beam according to the uplink and downlink reciprocity and the transmission mode of the DCI or the receiving mode for receiving the DCI. Alternatively, the terminal obtains the uplink sending beam according to the transmission mode of the DCI (or the receiving mode of the DCI) only when the distance between the time unit where the DCI is located and the time unit of the uplink data channel is within a predetermined threshold. When the distance between the time unit where the DCI is located and the time unit of the uplink data channel is beyond the predetermined threshold, the sending beam of the uplink data channel is still notified through a higher layer.

Application Example 19

In the present embodiment, two transmission mode modes exist in which the terminal sends an uplink signal, and which mode to use is determined according to an explicit indication of a base station or according to whether a predetermined condition is satisfied.

In the first transmission mode mode, the terminal sends the uplink signal in a combination of a first transmission mode set and a second transmission mode, which may also be referred to as a multi-beam mode. For example, the first transmission mode set includes an auxiliary sending beam and the second transmission mode set includes a main sending beam.

In the second transmission mode mode, the terminal uses the second transmission mode set, where the second transmission mode set includes the main sending beam.

When the uplink signal is an uplink control channel, a first transmission mode mode in use is determined according to a type of the uplink control channel, for example, the first transmission mode mode is configured for an uplink control channel for feeding back periodic CSI, and the second transmission mode mode is configured for ACK/NACK. The second transmission mode mode is used when the LTE network is provided, and the first transmission mode mode is used when the NR network is provided.

When the uplink signal is a data channel for feeding back ACK/NACK, where the ACK/NACK is response information to downlink data, when the downlink data is retransmission data, the first transmission mode mode is configured for the uplink signal, and when the downlink data is transmitted for the first time, the second transmission mode mode is configured for the uplink signal.

When the uplink signal is an uplink data channel,

Application Example 20

In the present application example, when a terminal uses N transmission mode sets to send an uplink signal, the terminal determines switched time domain resource granularities of transmission modes of the uplink signal or determines the number of time domain resource granularities of the transmission modes of the uplink signal according to a value of N and the number of demodulation reference signal ports allocated to the uplink signal.

When a sending beam (i.e., the transmission mode) is a radio frequency beam and the radio frequency beam of the terminal is limited, for example, merely Q transmission mode sets can be generated by the terminal at a time, when N transmission mode sets are configured for sending the uplink signal, the time domain resources occupied by the uplink signal need to be divided into [N/Q] time granularity units, and the transmission mode sets in different time granularity units may be different. And/or a same demodulation reference signal port needs to occupy REs on different time domain granularity units, and/or the same demodulation reference signal port cannot perform joint channel estimation on different time domain granularity units.

In the above description, the time domain resources occupied by the uplink signal is divided into [N/Q] time granularity units, or the time domain granularity units are agreed, and the terminal determines the number of switched time domain resource granularities of the transmission mode sets of the uplink signal according to the value of N and the number of demodulation reference signal ports allocated to the uplink signal.

Application Example 21

In the present application example, when an uplink signal is sent by using multiple beams which are time-division, the uplink signal may be sent on different time domain symbols in a slot (or the time domain symbols in a slot are divided into multiple time granularity units and different sending beam sets occupy different time granularity units) or different sending beam sets are sent in different slots.

Application Example 22

In the present application example, a terminal determines a value of N of transmission mode sets configured for sending an uplink signal according to a size of resources occupied by the uplink signal.

For example, a larger value of N is configured for a relatively large number of resources, and a smaller value of N is configured for a relatively small number of resources.

The resources include at least one of: a time domain resource, a frequency domain or a reference signal resource.

In the present application, the uplink control channel may also be sent in an uplink data channel. For example and similarly, UCI is sent in a PUSCH in LTE. The above method for determining the transmission mode of the uplink data channel or the uplink control channel may also be similarly configured for the method for determining the transmission mode (or receiving mode) of the downlink control channel or the downlink data channel.

The embodiments of the present disclosure further provide a computer storage medium configured to store computer programs for executing the steps in the signal transmission method in the embodiments described above when the computer programs are executed by a processor. The embodiments of the present disclosure further provide a computer storage medium configured to store computer programs for executing the steps in the control information sending method in the embodiments described above when the computer programs are executed by a processor.

The embodiments of the present disclosure further provide a signal transmission apparatus. The apparatus includes: a processor and a memory configured to store computer programs capable of being run on the processor.

The processor is configured to execute the steps in the signal transmission method described in the embodiments of the present disclosure when the computer programs are run.

The embodiments of the present disclosure further provide a control information sending apparatus. The apparatus includes: a processor and a memory configured to store computer programs capable of being run on the processor.

The processor is configured to execute the steps in the control information sending method described in the embodiments of the present disclosure when the computer programs are run.

It is understandable that the memory may be a volatile memory or a non-volatile memory, or may include both the volatile memory and the non-volatile memory. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic disk memory or a magnetic tape memory. The volatile memory may be a random access memory (RAM), which serves as an external cache. By way of illustration but not limitation, many forms of RAMs may be used, such as a static random access memory (SRAM), a synchronous static random access memory (SSRAM), a dynamic random access memory (DRAM), a synchronous dynamical random access memory (SDRAM), a double data rate synchronous dynamic random access memory (DDRSDRAM), an enhanced synchronous dynamic random access memory (ESDRAM), a syncLink dynamic random access memory (SLDRAM), and a direct rambus random access memory (DRRAM). The memory described in the embodiments of the present disclosure is intended to include, but is not limited to, these and any other suitable type of memory.

The methods disclosed by the embodiments of the present disclosure may be applied to a processor or may be implemented by the processor. The processor may be an integrated circuit chip with signal processing capabilities. In the implementation process, various steps of the methods described above may be performed by an integrated logic circuit of hardware or a software instruction in the processor. The processor described above may be a general-purpose processor, a digital signal processor (DSP), or another programmable logic device, another discrete gate or transistor logic device, another discrete hardware component, or the like. The processor may implement or execute various methods, steps and logic block diagrams disclosed in the embodiments of the present disclosure. The general-purpose processor may be a microprocessor or any conventional processor. The steps of the methods disclosed by the embodiments of the present disclosure may be directly implemented by a hardware decoding processor, or may be implemented by a combination of hardware and software modules in the decoding processor. The software module may be located in a storage medium located in the memory. The processor reads information in the memory and implements the steps of the methods described above in combination with hardware of the processor.

It should be understood by those skilled in the art that all or some steps in the methods described above may be implemented by relevant hardware (such as a processor) as instructed by programs, and the programs may be stored in a computer-readable storage medium, such as a ROM, a magnetic disk, or an optical disk. All or part of the steps in the embodiments described above may also be implemented by using at least one integrated circuit. Accordingly, the modules/units in the embodiments described above may be implemented by hardware. For example, the functions of these modules/units may be implemented by at least one integrated circuit. Alternatively, these modules/units may be implemented by software function modules. For example, the functions of these modules/units may be implemented by using a processor to execute programs/instructions stored in a memory. The embodiments of the present disclosure are not limited to any specific combination of hardware and software.

Although the embodiments disclosed by the present disclosure are as described above, the content thereof is merely embodiments for facilitating the understanding of the present disclosure and is not intended to limit the present disclosure. Any person skilled in the art to which the present disclosure pertains may make any modifications and changes in the form of implementation and details without departing from the spirit and scope disclosed by the present disclosure, but the protection scope of the present patent is still subject to the scope defined by the appended claims.

What is claimed is:

1. A signal transmission method, comprising:
   acquiring, by a first communication node, M sending beam sets, each of the M sending beam sets corresponds to one of M receiving beam sets of a downlink control channel resource set;
   receiving, by the first communication node, first indication information, and determining an acquisition mode for a sending beam set of an uplink channel according to the first indication information, wherein the first indication information indicates whether the sending beam set of the uplink channel is acquired according to a receiving beam set of the downlink control channel;

determining, by the first communication node, in the case that the first indication information indicates that the sending beam set of the uplink channel is acquired according to a receiving beam set of the downlink control channel, N sending beam sets for sending a first signal from the M sending beam sets; and sending, by the first communication node, the first signal to a second communication node by using the N sending beam sets;

wherein one sending beam set of the M sending beam sets comprises at least one transmission mode sending beam, wherein M is a natural number, and N is a natural number less than or equal to M;

wherein the N sending beam sets from the M sending beam sets is determined according to a priority order corresponding to the M sending beam sets in a case where N is less than M, wherein the priority order of the M sending beam sets is agreed with the second communication node, and the first signal comprises a signal over the uplink channel.

2. The method of claim 1, wherein the first communication node acquires the M sending beam sets through at least one of following manners:

obtaining the M sending beam sets according to many sending beams associated with first-type control information comprised in the first signal;

receiving second-type control information, and obtaining the M sending beam sets according to the second-type control information;

obtaining the M sending beam sets according to configuration information about a search space of a control channel monitored in a time unit associated with the first signal;

obtaining the M sending beam sets according to configuration information about a sending beam of the control channel monitored in the time unit associated with the first signal;

obtaining the M sending beam sets according to configuration information about a receiving mode of the control channel monitored in the time unit associated with the first signal;

obtaining the M sending beam sets by acquiring a sending beam of a second channel or a second signal associated with the first signal;

obtaining the M sending beam sets by acquiring a receiving mode of the second channel or the second signal associated with the first signal; or acquiring information about the M sending beam sets in an implicit manner.

3. The method of claim 2, wherein receiving, by the first communication node, the second-type control information and obtaining the M sending beam sets according to the second-type control information comprises at least one of following manners:

the second-type control information comprises information about a sending beam set of a control channel signal sent by a third communication node, and the first communication node obtains the M sending beam sets according to the sending beam set of the control channel signal sent by the third communication node, wherein the third communication node and the second communication node are a same communication node or different communication nodes;

the second-type control information comprises a plurality of pieces of control information, and the M sending beam sets are obtained according to the plurality of pieces of control information;

the second-type control information comprises information about a first reference signal, and the first communication node acquires the information about the M sending beam sets according to the first reference signal;

the second-type control information comprises information about a second reference signal, and the first communication node acquires the information about the M sending beam sets according to the second reference signal;

the second-type control information comprises information about a synchronization signal, and the first communication node acquires the information about the M sending beam sets according to the information about the synchronization signal; or the second-type control information indicates information about a group of first reference signals or information about a group of second reference signals, and the first communication node acquires the M sending beam sets according to the group of first reference signals or the group of second reference signals, wherein a transmission direction of the first reference signal is the same as a transmission direction of the first signal, and a transmission direction of the second reference signal is different from the transmission direction of the first signal.

4. The method of claim 2, wherein the time unit associated with the first signal comprises at least one of:

a time unit where the first signal is located;

a time unit where the second channel or the second signal associated with the first signal is located; or a time unit belonging to an agreed time unit window.

5. The method of claim 2, wherein the second channel or the second signal satisfies one of the following:

the second channel or the second signal is a channel or a signal received by the first communication node;

wherein the second channel or the second comprises at least one of: the control channel, the data channel, a demodulation reference signal, or the measurement reference signal;

wherein a sending beam of the second channel or the second signal is got according to a Quasi-Co-Location reference signal of the second channel or the second signal;

wherein a receiving mode of the second channel or the second signal is got according to the Quasi-Co-Location reference signal of the second channel or the second signal; or wherein the receiving mode of the second channel or the second signal comprises a receive beam of the second channel or the second signal.

6. The method of claim 1, wherein
the determining the N sending beam sets according to the time information corresponding to the M sending beam sets comprises: selecting N sending beam sets corresponding to time closest to the first signal from the M sending beam sets, wherein time corresponding to the one sending beam set is time at which a second channel or a second signal corresponding to the at least one sending beam of the one sending beam set is located; and wherein determining the N sending beam sets according to the time domain density information corresponding to the M sending beam sets comprises:
selecting N sending beam sets corresponding to highest time domain densities from the M sending beam sets.

7. The method of claim 1, wherein the sending, by the first communication node, the first signal to the second communication node by using the N sending beam sets comprises at least one combination of following manners:
sending the first channel or the first signal in a time division multiplexing manner by using the N sending beam sets;
sending the first signal in a frequency division multiplexing manner by using the N sending beam sets;
one sending beam corresponding to one demodulation reference signal port group, and sending the first signal on each port of the one demodulation reference signal port group by using the one sending beam;
a plurality of sending beams corresponding to one demodulation reference signal port, and sending the first signal on the one demodulation reference signal port by using the plurality of sending beam;
one sending beam corresponding to one antenna port group, and sending the first signal on each port of the one antenna port group by using the one sending beam; or
determining a number of time granularities occupied by the N sending beam sets according to a value of N and a number of demodulation reference signal ports or sending antenna ports allocated to the first signal.

8. The method of claim 7, wherein a time unit for sending the first signal in a time division manner by using the N sending beam sets comprises at least one of:
a slot, a time domain OFDM symbol or multiple time domain symbols in a slot.

9. The method of claim 1, wherein the N sending beam sets satisfy one of the following:
the N sending beam sets comprise a first sending beam set and a second sending beam set, wherein information included in the first signal sent in the first sending beam set is a subset of information sent in the second sending beam set;
information included in the first channel or the first signal sent in different sending beam sets among the N sending beam sets is the same; or
the information included in the first signal sent in the different sending beam sets among the N sending beam sets is different.

10. The method of claim 1, wherein the first signal satisfies at least one of the following:
the sending beam of the first signal and a receiving mode of the second channel or the second signal share configuration information;
determining the sending beam of the first signal according to a receiving mode of the second channel or the second signal;
wherein a transmission direction of the first signal is different from a transmission direction of the second channel or the second signal.

11. The method of claim 10, wherein the first signal satisfies at least one of the following:
the sending beam of the first signal and the receiving mode of the second channel or the second signal share the configuration information, wherein resource granularities corresponding to different sending beams of the first signal in the configuration information are different independent from resource granularities corresponding to different receiving modes of the second channel or the second signal in the configuration information;
the sending beam of the first signal and the receiving mode of the second channel or the second signal share the configuration information, wherein resource proportions occupied by the different sending beams of the first signal in the configuration information are different independent from resource proportions occupied by the different receiving modes of the second channel or the second signal in the configuration information; or
the sending beam of the first signal and the receiving mode of the second channel or the second signal share the configuration information, wherein multiplexing manners of the different sending beams of the first signal in the configuration information are different independent from multiplexing manners of the different receiving modes of the second channel or the second signal in the configuration information;
wherein a resource comprises at least one of: a time domain resource, a frequency domain resource or a reference signal port resource;
wherein a sending beam of the second channel or the second signal is got according to a Quasi-Co-Location reference signal of the second channel or the second signal;
wherein a receiving mode of the second channel or the second signal is got according to the Quasi-Co-Location reference signal of the second channel or the second signal; or
wherein the receiving mode of the second channel or the second signal comprises a receive beam of the second channel or the second signal,
wherein the sending beam of the first signal comprises the transmit beam of the first signal.

12. The method of claim 1, the method further comprises:
receiving signaling information, wherein the signaling information indicates whether a sending beam of an uplink control channel is acquired according to a sending beam of a downlink control channel.

13. The method of claim 1, wherein
the determining the N sending beam sets according to the time information corresponding to the M sending beam sets comprises: selecting N sending beam sets corresponding to time closest to the first signal from the M sending beam sets, wherein time corresponding to the one sending beam set is time at which a second channel or a second signal corresponding to the at least one sending beam of the one sending beam set is located; and
wherein determining the N sending beam sets according to the time domain density information corresponding to the M sending beam sets comprises:
selecting N sending beam sets corresponding to highest time domain densities from the M sending beam sets.

14. A signal reception method, comprising:
transmitting, by a second communication node, first indication information, and determining an acquisition mode for a receiving beam set of an uplink channel according to the first indication information, wherein the first indication information indicates whether the sending beam set of the uplink channel is acquired according to a receiving beam set of the downlink control channel for a first communication node;
receiving, by a second communication node using N receiving beam sets in the case that the first indication information indicates that the sending beam set of the uplink channel is acquired according to the receiving beam set of the downlink control channel for the first communication, a first signal sent from the first communication node by using N sending beam sets, wherein the N sending beam sets at the first communication corresponds to the N receiving beam sets at the second communication node;

wherein the N sending beam sets belong to M sending beam sets, one sending beam set of the M sending beam sets comprises at least one sending beam and corresponds to one receiving beam of a downlink control channel resource set, wherein M is a natural number, and N is a natural number less than or equal to M;

wherein the N sending beam sets from the M sending beam sets is determined according to a priority order corresponding to the M sending beam sets in a case where N is less than M, wherein the priority order of the M sending beam sets is agreed with the second communication node, and the first signal comprises a signal over the uplink channel.

15. The method of claim 14, wherein the second communication node acquires the M sending beam sets through at least one of following manners:
    obtaining the M sending beam sets according to many sending beams associated with first-type control information comprised in the first signal;
    sending second-type control information, and obtaining the M sending beam sets according to the second-type control information;
    obtaining the M sending beam sets according to configuration information about a to-be-detected search space of a control channel monitored by the first communication node in a time unit associated with the first signal;
    obtaining the M sending beam sets according to configuration information about a to-be-detected sending beam of the control channel monitored by the first communication node in the time unit associated with the first signal;
    obtaining the M sending beam sets according to configuration information about a to-be-detected receiving mode of the control channel monitored by the first communication node in the time unit associated with the first channel or the first signal;
    obtaining the M sending beam sets by acquiring a sending beam of a second channel or a second signal associated with the first signal;
    obtaining the M sending beam sets by acquiring a receiving mode of the second channel or the second signal associated with the first signal; or
    acquiring information about the M sending beam sets in an implicit manner.

16. The method of claim 14, wherein receiving, by the second communication node, the first signal sent from the first communication node by using N reception mode sets comprises at least one combination of following manners:
    receiving the first signal in a time division multiplexing manner by using the N sending beam sets;
    receiving the first signal in a frequency division multiplexing manner by using the N sending beam sets;
    one reception mode corresponding to one demodulation reference signal port group, and sending the first signal on each port of the one demodulation reference signal port group by using the one sending beam;
    a plurality of reception modes corresponding to one demodulation reference signal port, and receiving the first signal on the one demodulation reference signal port by using the plurality of reception modes;
    one reception mode corresponding to one antenna port group, and receiving the first signal on each port of the one antenna port group by using the one reception mode;
    or
    determining a number of time granularities occupied by the N reception mode sets according to a value of N and a number of demodulation reference signal ports or sending antenna ports allocated to the first channel or the first signal.

17. The method of claim 14, wherein the N sending beam sets satisfy one of the following:
    the N sending beam sets comprise a first sending beam set and a second sending beam set, wherein information included in the first signal sent in the first sending beam set is a subset of information sent in the second sending beam set;
    information included in the first signal sent in different sending beam sets among the N sending beam sets is the same; or
    the information included in the first channel or the first signal sent in the different sending beam sets among the N sending beam sets is different.

18. The method of claim 14, wherein the first signal satisfies at least one of the following:
    the sending beam of the first signal and a receiving mode of the second channel or the second signal share configuration information;
    determining the sending beam of the first signal according to a receiving mode of the second channel or the second signal;
    wherein a transmission direction of the first signal is different from a transmission direction of the second channel or the second signal;
    wherein the first signal satisfies at least one of the following:
        the sending beam of the first signal and the receiving mode of the second channel or the second signal share the configuration information, wherein resource granularities corresponding to different sending beams of the first signal in the configuration information are different independent from resource granularities corresponding to different receiving modes of the second channel or the second signal in the configuration information;
        the sending beam of the first signal and the receiving mode of the second channel or the second signal share the configuration information, wherein resource proportions occupied by the different sending beams of the first signal in the configuration information are different independent from resource proportions occupied by the different receiving modes of the second channel or the second signal in the configuration information; or
        the sending beam of the first signal and the receiving mode of the second channel or the second signal share the configuration information, wherein multiplexing manners of the different sending beams of the first signal in the configuration information are independent from multiplexing manners of the different receiving modes of the second channel or the second signal in the configuration information;
    wherein a resource comprises at least one of: a time domain resource, a frequency domain resource or a reference signal port resource;
    wherein a sending beam of the second channel or the second signal is got according to a Quasi-Co-Location reference signal of the second channel or the second signal;

wherein a receiving mode of the second channel or the second signal is got according to the Quasi-Co-Location reference signal of the second channel or the second signal; or wherein the receiving mode of the second channel or the second signal comprises a receive beam of the second channel or the second signal, wherein the sending beam of the first signal comprises the transmit beam of the first signal.

* * * * *